United States Patent
Park et al.

(10) Patent No.: US 12,197,064 B2
(45) Date of Patent: Jan. 14, 2025

(54) LIQUID CRYSTAL DISPLAY AND MANUFACTURING METHOD THEREOF

(71) Applicant: SAMSUNG DISPLAY CO., LTD., Yongin-si (KR)

(72) Inventors: Jae Byung Park, Seoul (KR); Sung Sik Yun, Suwon-si (KR); Jong Hyuk Kang, Suwon-si (KR); Hae Il Park, Seoul (KR); Hyun Min Cho, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/812,226

(22) Filed: Jul. 13, 2022

(65) Prior Publication Data
US 2022/0350194 A1   Nov. 3, 2022

Related U.S. Application Data

(63) Continuation of application No. 17/197,571, filed on Mar. 10, 2021, now Pat. No. 11,409,155, which is a
(Continued)

(30) Foreign Application Priority Data

Mar. 15, 2012   (KR) .................. 10-2012-0026772

(51) Int. Cl.
*G02F 1/1335*   (2006.01)
*G02F 1/1333*   (2006.01)
(Continued)

(52) U.S. Cl.
CPC ............ *G02F 1/133514* (2013.01); *G02F 1/133377* (2013.01); *G02F 1/133528* (2013.01);
(Continued)

(58) Field of Classification Search
CPC ......... G02F 1/136209; G02F 1/133514; G02F 1/133377; G02F 1/133528;
(Continued)

(56) References Cited

U.S. PATENT DOCUMENTS 5,146,355 A    9/1992   Prince et al.
5,469,280 A    11/1995  Jang
(Continued)

FOREIGN PATENT DOCUMENTS

JP   11-237632    8/1999
JP   2001-083501  3/2001
(Continued)

OTHER PUBLICATIONS

Korean Office Action dated Nov. 25, 2021 in corresponding Korean Patent Application No. 10/2021/0113784 (in Korean) (6 pages).
(Continued)

*Primary Examiner* — Nathanael R Briggs
(74) *Attorney, Agent, or Firm* — F. Chau & Associates, LLC

(57) ABSTRACT

A wide viewing angle liquid crystal display includes color filters having a quantum dot and scattering particles and liquid crystal layer disposed in a microcavity, a distance between the color filter and the liquid crystal layer being sized to minimize display deterioration due to parallax.

24 Claims, 35 Drawing Sheets

Related U.S. Application Data continuation of application No. 16/589,574, filed on Oct. 1, 2019, now Pat. No. 10,983,386, which is a continuation of application No. 15/978,288, filed on May 14, 2018, now Pat. No. 10,429,690, which is a continuation of application No. 15/499,542, filed on Apr. 27, 2017, now Pat. No. 9,995,958, which is a continuation of application No. 13/645,207, filed on Oct. 4, 2012, now Pat. No. 9,995,963.

(51) Int. Cl.
  *G02F 1/13357* (2006.01)
  *G02F 2/02* (2006.01)

(52) U.S. Cl.
  CPC .......... *G02F 1/133617* (2013.01); *G02F 2/02* (2013.01); *G02F 2201/08* (2013.01); *G02F 2202/02* (2013.01); *G02F 2202/36* (2013.01); *G02F 2203/055* (2013.01)

(58) Field of Classification Search
  CPC ................ G02F 1/133617; G02F 2/02; G02F 2201/08; G02F 2202/02; G02F 2202/36; G02F 2203/055
  See application file for complete search history.

(56) References Cited

U.S. PATENT DOCUMENTS

| | | | |
|---|---|---|---|
| 5,748,272 A | 5/1998 | Tanaka et al. | |
| 6,141,072 A | 10/2000 | Drabik et al. | |
| 6,222,203 B1 | 4/2001 | Ishibashi et al. | |
| 6,333,724 B1 | 12/2001 | Taira et al. | |
| 6,515,724 B1 | 2/2003 | Drost et al. | |
| 6,573,961 B2 | 6/2003 | Jiang et al. | |
| 6,864,931 B1 | 3/2005 | Kumar et al. | |
| 7,223,641 B2 | 5/2007 | Maekawa | |
| 7,252,864 B2 | 8/2007 | Nair et al. | |
| 7,486,353 B2 | 2/2009 | Takizawa et al. | |
| 7,576,478 B2 | 8/2009 | Hikmet | |
| 7,649,594 B2 | 1/2010 | Kim et al. | |
| 7,656,476 B2 | 2/2010 | So | |
| 7,746,423 B2 | 6/2010 | Im et al. | |
| 7,750,984 B2 | 7/2010 | Ha et al. | |
| 8,294,848 B2 | 10/2012 | Cho et al. | |
| 8,305,526 B2 | 11/2012 | So | |
| 8,817,207 B2 | 8/2014 | Rho et al. | |
| 9,995,958 B2 | 6/2018 | Park et al. | |
| 9,995,963 B2 | 6/2018 | Park et al. | |
| 10,429,690 B2 | 10/2019 | Park et al. | |
| 10,983,386 B2 | 4/2021 | Park et al. | |
| 2003/0086037 A1 | 5/2003 | Sekiguchi | |
| 2005/0275778 A1* | 12/2005 | Cho | G02F 1/133536 349/114 |
| 2006/0240286 A1 | 10/2006 | Park et al. | |
| 2007/0126951 A1 | 6/2007 | Vogels et al. | |
| 2007/0268429 A1 | 11/2007 | So | |
| 2008/0252799 A1 | 10/2008 | Lee et al. | |
| 2008/0252815 A1 | 10/2008 | Wang et al. | |
| 2009/0091689 A1 | 4/2009 | Rho et al. | |
| 2009/0128753 A1* | 5/2009 | Shi | G02F 1/133512 349/126 |
| 2009/0147497 A1 | 6/2009 | Nada | |
| 2009/0268461 A1 | 10/2009 | Deak et al. | |
| 2010/0053488 A1* | 3/2010 | Kim | G02F 1/136213 349/48 |
| 2010/0091219 A1* | 4/2010 | Rho | G02F 1/133512 349/110 |
| 2010/0302481 A1 | 12/2010 | Baum et al. | |
| 2011/0309397 A1* | 12/2011 | Cheng | G02F 1/133514 257/E33.071 |
| 2012/0019740 A1 | 1/2012 | Kadowaki et al. | |
| 2012/0062448 A1 | 3/2012 | Kim et al. | |
| 2012/0064228 A1 | 3/2012 | Kitamura et al. | |
| 2013/0242228 A1 | 9/2013 | Park et al. | |
| 2017/0227813 A1 | 8/2017 | Park et al. | |
| 2018/0259811 A1 | 9/2018 | Park et al. | |
| 2020/0033669 A1 | 1/2020 | Park et al. | |
| 2021/0215967 A1 | 7/2021 | Park et al. | |

FOREIGN PATENT DOCUMENTS

| | | |
|---|---|---|
| JP | 2007-025621 | 2/2007 |
| JP | 2007-178902 | 7/2007 |
| JP | 2008-090298 | 4/2008 |
| JP | 2009-115924 | 5/2009 |
| JP | 2009-156885 | 7/2009 |
| KR | 10-2001-0005935 | 1/2001 |
| KR | 10-2006-0113160 | 11/2006 |
| KR | 10-2006-0131649 | 12/2006 |
| KR | 10-2007-0070052 | 7/2007 |
| KR | 10-2007-0111610 | 11/2007 |
| KR | 10-2009-0025590 | 3/2009 |
| KR | 10-2009-0052730 | 5/2009 |
| KR | 10-2010-0041122 | 4/2010 |
| KR | 10-2010-0111103 | 10/2010 |

OTHER PUBLICATIONS

Office Action dated Oct. 10, 2017 in co-pending U.S. Appl. No. 15/499,542.

Office Action dated Sep. 18, 2017 in co-pending U.S. Appl. No. 13/645,207.

\* cited by examiner

FIG. 31
- Divergence angle ~80°
- Distance(LC to QD layer) ~ 500 um
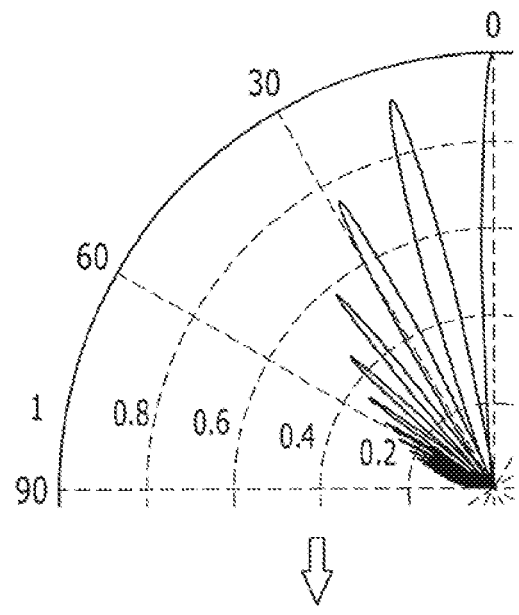
- Divergence angle ~55°
- Distance(LC to QD layer) ~ 100 um
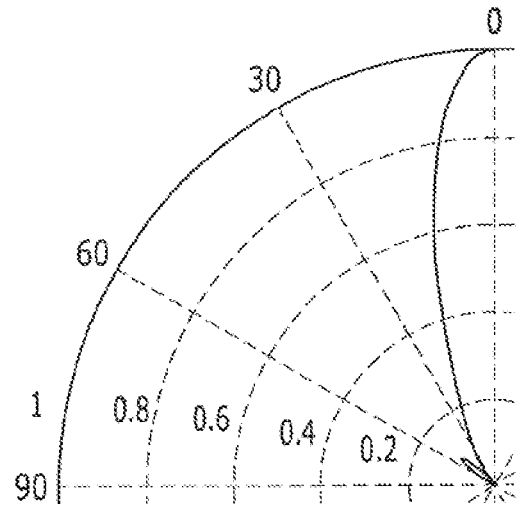

LIQUID CRYSTAL DISPLAY AND MANUFACTURING METHOD THEREOF

CROSS-REFERENCE TO RELATED APPLICATION

This application is a continuation of U.S. application Ser. No. 17/197,571, filed on Mar. 10, 2021, which is a continuation of U.S. application Ser. No. 16/589,574, filed on Oct. 1, 2019, which issued as U.S. Pat. No. 10,983,386, which is a continuation of U.S. application Ser. No. 15/978,288, filed on May 14, 2018, which issued as U.S. Pat. No. 10,429,690 on Oct. 1, 2019, which is a continuation of U.S. application Ser. No. 15/499,542, filed on Apr. 27, 2017, which issued as U.S. Pat. No. 9,995,958 on Jun. 12, 2018, which is a continuation of U.S. application Ser. No. 13/645,207, filed on Oct. 4, 2012, which issued as U.S. Pat. No. 9,995,963 on Jun. 12, 2018 in the U.S. Patent and Trademark Office, which in turn claims priority under 35 U.S.C. § 119 from, and the benefit of, Korean Patent Application No. 10-2012-0026772, filed in the Korean Intellectual Property Office on Mar. 15, 2012, the contents of which are herein incorporated by reference in their entirety.

TECHNICAL FIELD

The present disclosure relates to a liquid crystal display and a manufacturing method thereof.

DISCUSSION OF THE RELATED ART

A liquid crystal display, which is one of the most common types of flat panel displays currently in use, includes two sheets of panels with field generating electrodes such as a pixel electrode, a common electrode, and the like. A liquid crystal layer is interposed therebetween.

The liquid crystal display generates an electric field in the liquid crystal layer by applying voltage to the field generating electrodes. The direction of liquid crystal molecules of the liquid crystal layer is determined by the generated electric field. Thus, polarization of incident light is controlled so as to display images.

To display a color in the liquid crystal display, a color filter is used and a structure including a luminescent material as a material of the color filter has been developed. In the case where the luminescent material is included in the color filter, a liquid crystal display having a wide viewing angle may be easily manufactured and power consumption may be improved, but display characteristics due to an adjacent pixel and the parallax of a viewed object (i.e., the difference in the apparent position of an object viewed along two different lines of sight) can be deteriorated.

SUMMARY

Exemplary embodiments of the present invention provide a liquid crystal display such that display characteristics due to parallax are not deteriorated and the display has a wide viewing angle. A manufacturing method thereof is also provided.

An exemplary embodiment of the present invention provides a liquid crystal display. A backlight unit includes a light source. A display panel includes a liquid crystal layer disposed in a microcavity. A color filter is configured to change a wavelength of light supplied from the light source to display a color. A lower polarizer is located between the liquid crystal layer and the backlight unit. An upper polarizer is located between the liquid crystal layer and the color filter.

The display panel may include an upper panel and a lower panel. The lower panel may include the liquid crystal layer and the lower polarizer. The upper panel may include the color filter.

The upper polarizer may be included in the upper panel or the lower panel, and the upper panel may be disposed above the upper polarizer and the lower panel may be disposed below the upper polarizer.

The upper and lower polarizers may include a polarization element configured to generate polarization and a tri-acetyl-cellulose (TAC) layer for ensuring durability. The microcavity may be shaped by a support layer. An alignment layer may be formed on the support layer. The liquid crystal layer may be aligned by the alignment layer.

A common electrode and a patterned insulating layer may be over the support layer, and a liquid crystal injection hole may be formed on the patterned insulating layer, the common electrode, and the support layer.

The color filter may include quantum dot particles configured to convert light supplied from the light source.

The light source may be a blue light source.

A color filter may be a transparent color filter for displaying the color blue, and the transparent color filter may include scattering particles.

A blue light transmitting layer may be located between the liquid crystal layer and the color filter and may be configured to transmit only light in a blue wavelength band.

A blue light blocking layer may be configured to block light in a blue wavelength band and may be located at a side of the color filter opposite the blue light transmitting layer.

The transparent color filter may not have the blue light blocking layer formed thereon.

The light source may be an ultraviolet rays light source.

An ultraviolet rays transmitting layer may be located between the liquid crystal layer and the color filter and nay be configured to transmit only ultraviolet rays.

An ultraviolet rays blocking layer may be configured to block the ultraviolet rays and may be located at a side of the color filter opposite the ultraviolet rays transmitting layer.

The display panel may be formed by one display panel.

The upper polarizer may include metal wirings arranged with an interval of 100 nm or less.

An exemplary embodiment of the present invention provides a method of manufacturing a liquid crystal display, including: forming a thin film transistor on a substrate; forming a pixel electrode on the thin film transistor, forming a sacrificial layer on the pixel electrode, forming a support layer on the sacrificial layer, forming a microcavity including a liquid crystal injection hole by removing the sacrificial layer; injecting a liquid crystal material into microcavity, forming a coating layer on the support layer so as to cover the liquid crystal injection hole, and forming a color filter including quantum dot particles for converting light supplied from a light source.

The method of manufacturing a liquid crystal display may further include forming an alignment layer on an outer wall of the microcavity before the liquid crystal material is injected into the microcavity.

The method of manufacturing a liquid crystal display may further include forming a common electrode between the support layer and the coating layer, in which the liquid crystal injection hole may also be formed in the common electrode.

According to an exemplary embodiment of the present invention a liquid crystal display includes a backlight unit, a color filter and a liquid crystal layer formed in a microcavity located between the backlight unit and the color filter. The color filter includes quantum dot particles configured to refract and disperse light from the backlight unit. A distance between the color filter and the liquid crystal layer is sized to minimize display deterioration due to parallax.

BRIEF DESCRIPTION OF THE DRAWINGS

FIGS. 20, 21, 22, 23, 24, 25, 26, 27, 28, 29, 30 and 31 are graphs showing characteristics of the liquid crystal display according to exemplary embodiments of the present invention.

DETAILED DESCRIPTION

Figure 1:
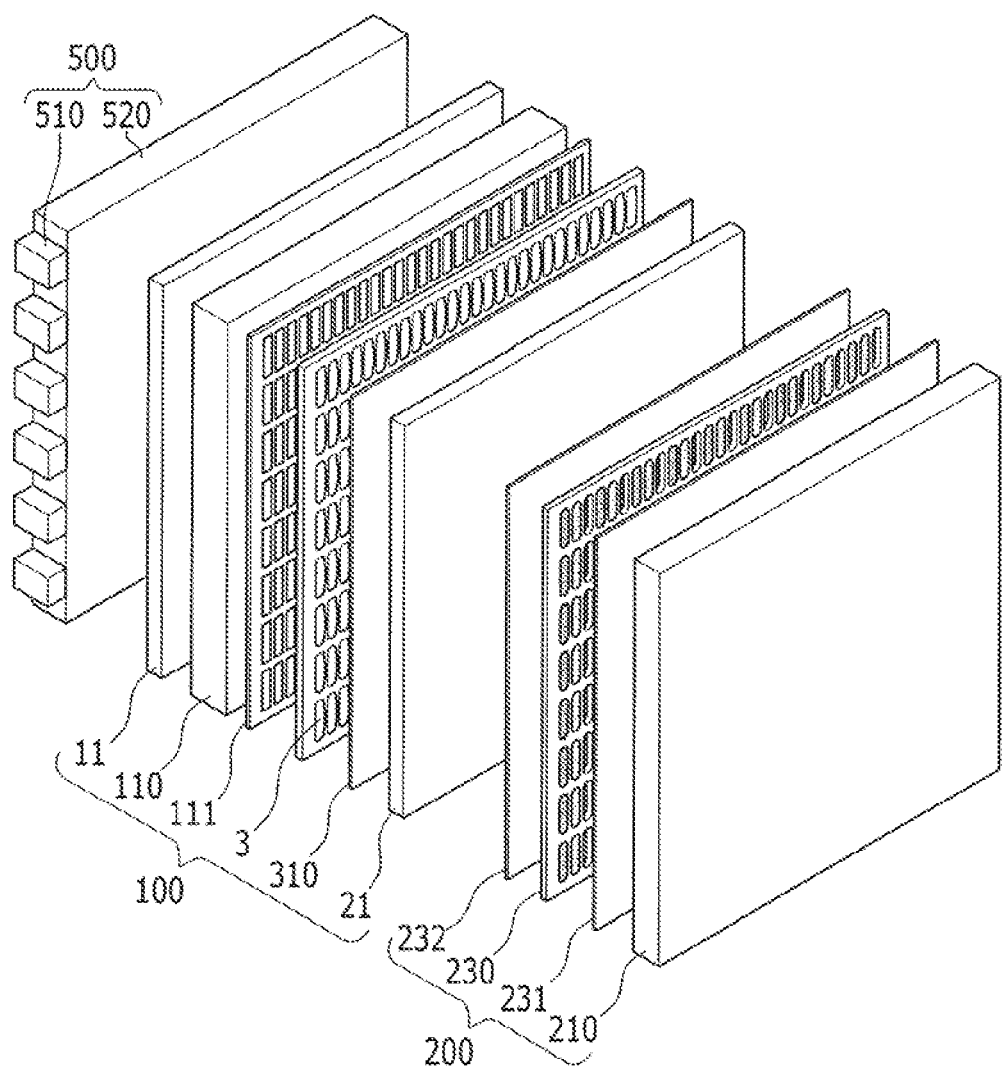
FIG. 1 is an exploded perspective view of a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present.

Hereinafter, a liquid crystal display according to an exemplary embodiment of the present invention will be described in detail with reference to FIGS. 1 and 2.

Figure 2:
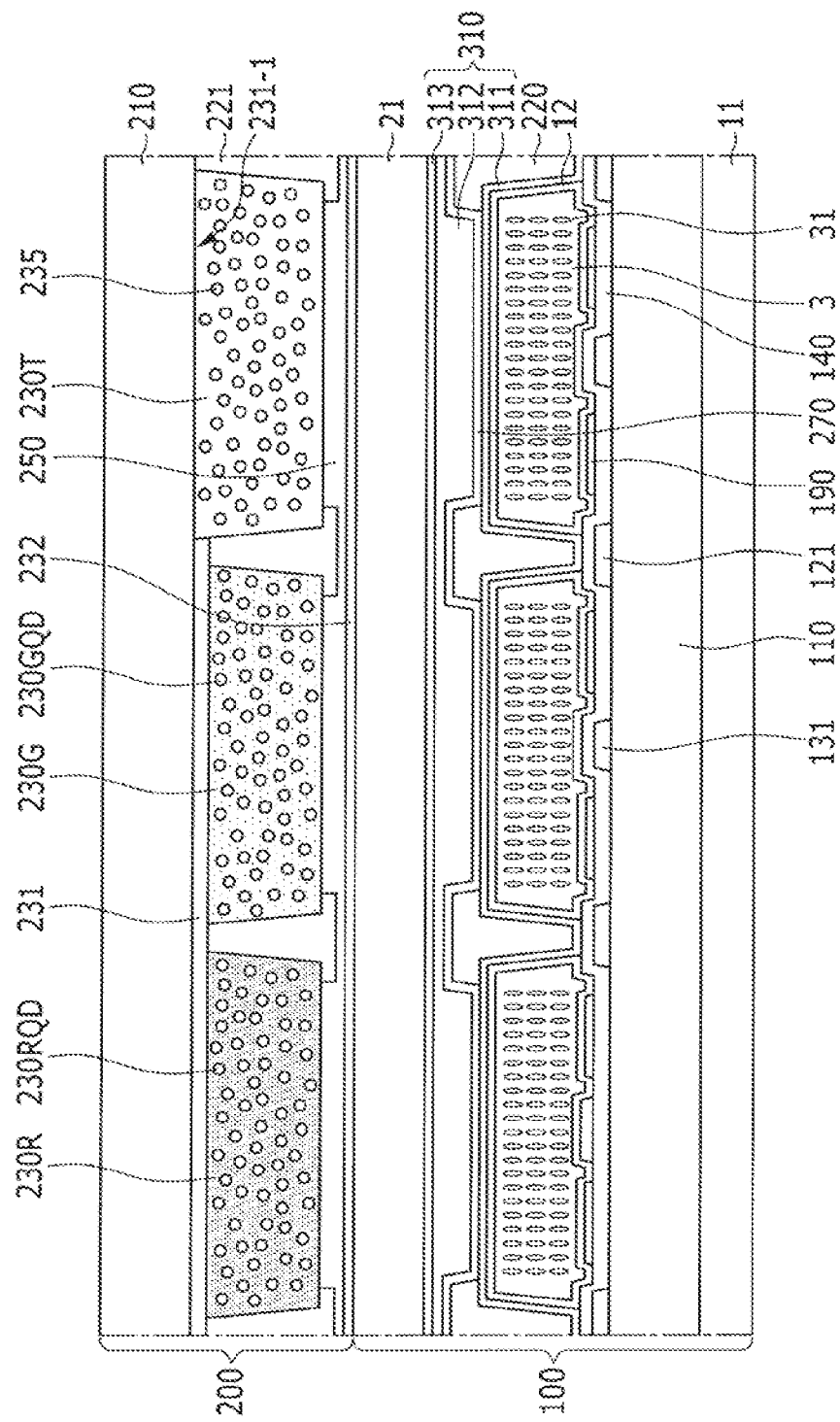
FIG. 2 is a cross-sectional view of the liquid crystal display according to the exemplary embodiment of FIG. 1.

FIG. 1 is an exploded perspective view of a liquid crystal display according to an exemplary embodiment of the present invention and FIG. 2 is a cross-sectional view of the liquid crystal display according to the exemplary embodiment of FIG. 1.

As shown in FIG. 1, the liquid crystal display according to the exemplary embodiment of the present invention includes a lower panel 100, an upper panel 200, and a backlight unit 500.

The backlight unit 500 includes a blue light source 510 and a light guide plate 520. The lower panel 100 disposed thereon includes a lower polarizer 11, a lower substrate 110, a wiring layer 111, a liquid crystal layer 3 formed in a microcavity, an upper insulating layer 310, and an upper polarizer 21. The upper panel 200 disposed thereon includes an upper substrate 210, a blue light blocking layer 231, a color filter 230, and a blue light transmitting layer 232.

First, the lower panel 100 will be described with reference to FIGS. 1, 2 and 3.

Figure 3:
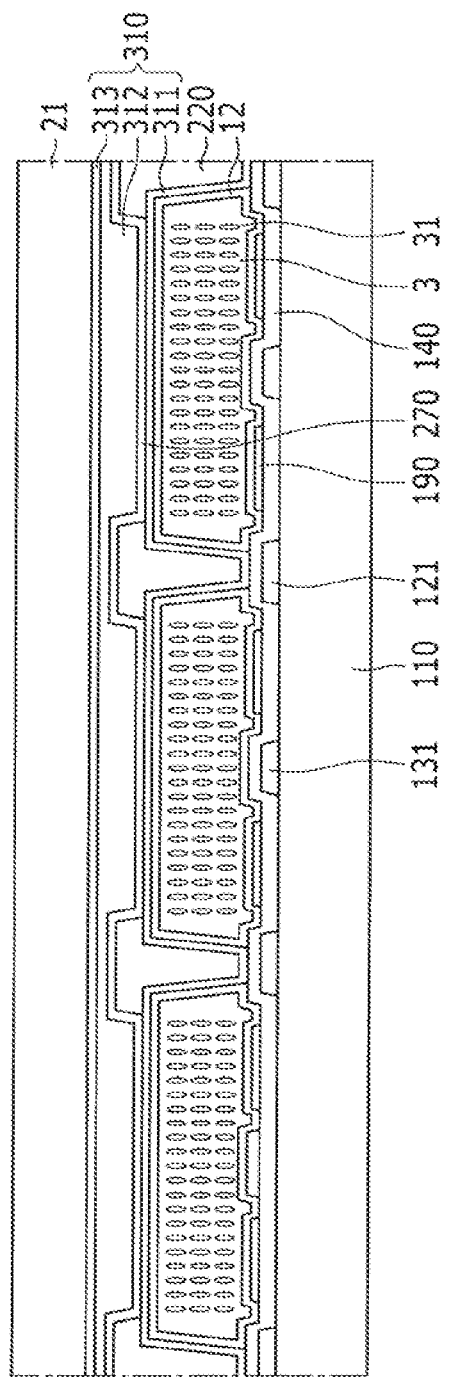
FIG. 3 is a cross-sectional view of a lower panel in the liquid crystal display according to the exemplary embodiment of FIG. 1.

FIG. 3 is a cross-sectional view of a lower panel in the liquid crystal display according to the exemplary embodiment of FIG. 1.

Referring to FIGS. 1 to 3, a wiring layer 111 including a thin film transistor (not shown) and the like is formed on a substrate 110 made of transparent glass, plastic, or the like. The wiring layer 111 includes a gate line 121, a storage voltage line 131, a gate insulating layer 140, a data line (not shown), a passivation layer (not shown) and a pixel electrode 190, and the thin film transistor is connected to the gate line 121 and the data line. Structures of the pixel electrode 190, the gate line 121, and the data line formed on the wiring layer 111 may vary according to an exemplary embodiment.

The gate line 121 and the storage voltage line 131 are disposed below the gate insulating layer 140 and are electrically separated from each other. The data line crosses the gate line 121 and the storage voltage line 131 and is insulated therefrom. The gate electrode on the gate line 121 and the source electrode on the data line provide a control terminal and an input terminal of the thin film transistor, respectively. Further, an output terminal (drain electrode) of the thin film transistor is connected with the pixel electrode 190, and the pixel electrode 190 is insulated from the gate line 121, the storage voltage line 131 and the data line.

A support layer 311 is disposed on the pixel electrode 190 and the passivation layer. The support layer 311 serves to support itself so that an inner portion of the support layer 311, that is, an upper space, hereinafter referred to as a microcavity (see microcavity 305 of FIG. 11) of the pixel electrode 190 and the passivation layer may be formed. A cross section of the support layer 311 according to the exemplary embodiment may have a trapezoid shape, and have a liquid crystal injection hole 335 (seen in FIG. 14) on one side thereof in order to inject a liquid crystal into the microcavity 305. The support layer 311 may include an inorganic insulating material such as silicon nitride (SiNx) and the like.

Further, to arrange liquid crystal molecules injected in the microcavity 305, an alignment layer 12 is formed at the inside of the support layer 311, that is, at the upper portion of the pixel electrode 190 and the passivation layer. The alignment layer 12 made of at least one of generally used materials such as polyamic acid, polysiloxane, or polyimide, or the like, as a liquid crystal alignment layer may be formed.

The liquid crystal layer 3 is formed under the alignment layer 12 of the microcavity 305, and the liquid crystal molecules 31 are initially aligned by the alignment layer 12. A thickness of the liquid crystal layer 3 may be about 5 to 6 μm.

A light blocking member 220 is formed between the adjacent support layers 311. The light blocking member 220 includes a material which does not transmit light and has an opening, and the opening that corresponds with the microcavity 305.

A common electrode 270 is formed on the support layer 311 and the light blocking member 220. The common electrode 270 and the pixel electrode 190 are made of a transparent conductive material such as ITO or IZO and serve to control an alignment direction of the liquid crystal molecules 31 by generating an electric field.

A flattening layer 312 is formed on the common electrode 270. The flattening layer 312, as a layer for removing a step generated on the common electrode 270 due to the light blocking member 220, may include an organic material. The flattening layer 312 may alternatively be disposed below the common electrode 270 or may be omitted.

A patterned insulating layer 313 is formed on the flattening layer 312. The patterned insulating layer 313 may include an inorganic insulating material such as silicon nitride (SiNx). The flattening layer 312 and the patterned insulating layer 313 are patterned together with the support layer 311 and combined to form upper insulating layer 310 and provide a liquid crystal injection hole 335. In an alternative exemplary embodiment the patterned insulating layer 313 may be omitted.

In FIG. 1, the support layer 311, the flattening layer 312, and the patterned insulating layer 313 are shown as one upper insulating layer 310. As shown in FIG. 2, the common electrode 270 is disposed between the support layer 311 and the flattening layer 312. However, as long as the common electrode 270 is an upper portion of the support layer 311, the common electrode 270 may also be disposed above the flattening layer 312 or the patterned insulating layer 313.

An upper polarizer 21 is disposed above the patterned insulating layer 313. The upper polarizer 21 may be thinly formed and may have a thickness of 150 to 200 μm. The upper polarizer 21 includes a polarization element generating polarization and a tri-acetyl-cellulose (TAC) layer for ensuring durability.

A lower polarizer 11 is attached to the rear surface of the substrate 110. The lower polarizer 11 may not be thinly formed and includes a polarization element generating polarization and a tri-acetyl-cellulose (TAC) layer for ensuring durability. However, the lower polarizer 11 may be formed between the substrate 110 and the wiring layer 111 and may also be formed at other positions.

Hereinafter, a manufacturing method of the lower panel 100 will be described in detail with reference to FIGS. 4 to 14.

FIGS. 4 to 14 are diagrams illustrating in sequence a manufacturing method of the lower panel according to the exemplary embodiment of FIG. 3.

Figure 4:
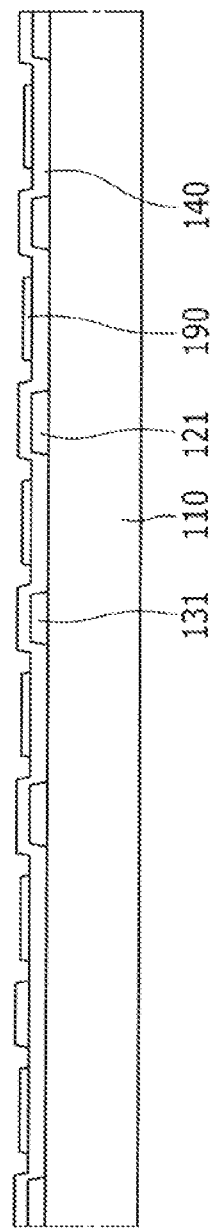
FIGS. 4, 5, 6, 7, 8, 9, 10, 11, 12, 13 and 14 are diagrams illustrating in sequence a manufacturing method of the lower panel according to the exemplary embodiment of FIG. 3.

First, as shown in FIG. 4, the wiring layer 111 shown in FIG. 1, including a thin film transistor and the like, is formed on a lower substrate 110.

The lower substrate is made of transparent glass, plastic, or the like, the gate line 121, the storage voltage line 131, the gate insulating layer 140, the data line (not shown), the passivation layer (not shown), and the pixel electrode 190 are formed on the wiring layer 111, and the thin film transistor is connected to the gate line 121 and the data line.

In FIG. 4, it is simply described that the wiring layer 111 is formed on the lower substrate 110, but actually, a plurality of processes are included.

For example, the plurality of processes are as follows.

On the lower substrate 110, the gate line 121 and the storage voltage line 131 are formed and thereafter, the gate insulating layer 140 covering the lower substrate 110, the gate line 121, and the storage voltage line 131 are formed.

On the gate insulating layer 140, the data line is formed in a direction crossing the gate line 121 and the storage voltage line 131, and a drain electrode, which is an output terminal of the thin film transistor, is also formed. Thereafter, a passivation layer covering the data line and the drain electrode is formed and a contact hole which exposes a part of the drain electrode is formed in the passivation layer.

The pixel electrode 190 is formed on the passivation layer and is electrically connected with the drain electrode through the contact hole of the passivation layer.

In FIG. 4, as described above, structures of the pixel electrode 190, the gate line 121, and the data line may be varied according to an exemplary embodiment.

Figure 5:
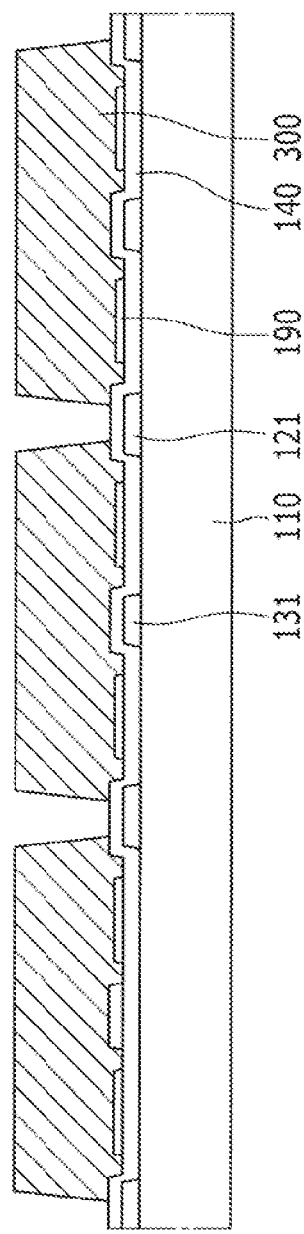

Thereafter, referring to FIG. 5, a sacrificial layer 300 is formed in a region where the microcavity is to be formed. The sacrificial layer may be made of a photoresist material and be formed by being etched in accordance with the position, the size, and the shape of the microcavity to be formed. Since the microcavity is positioned where the liquid crystal layer 3 is to be formed, the microcavity corresponds to the pixel area.

Figure 6:
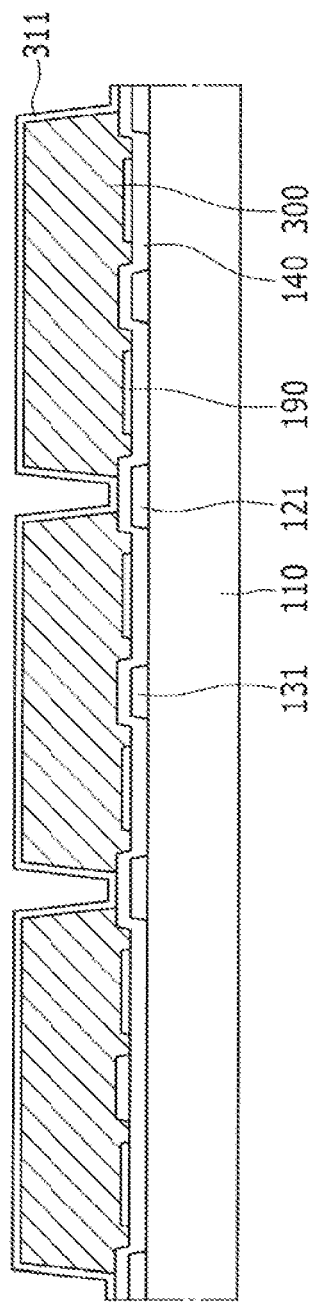

Thereafter, referring to FIG. 6, the support layer 311, which covers the sacrificial layer 300 and the exposed wiring layer 111, is formed. The support layer 311 may be made of an inorganic insulating material such as silicon nitride (SiNx) and may be formed to have a thickness of about 2000 Å. Further, the support layer 311 is formed so as to cover the entire sacrificial layer 300 along the surface of the sacrificial layer 300. As shown in FIG. 6, a cross section of the sacrificial layer 300 and the support layer 311 may form a trapezoid.

Figure 7:
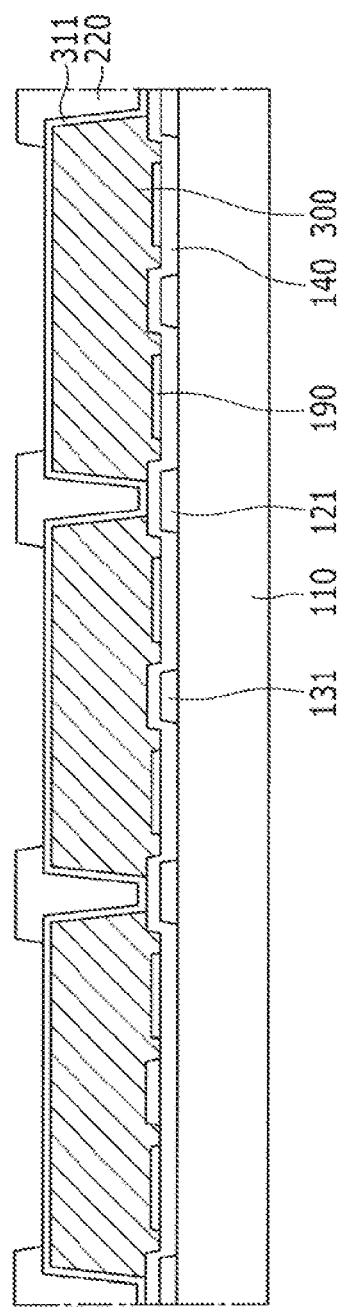

Next, as shown in FIG. 7, the light blocking member 220 is formed between the adjacent vertical portions of the support layers 311. The light blocking member 220 may be of a material which does not transmit light and has an opening. The opening of the light blocking member 220 corresponds to the sacrificial layer 300 or the microcavity 305.

Figure 8:
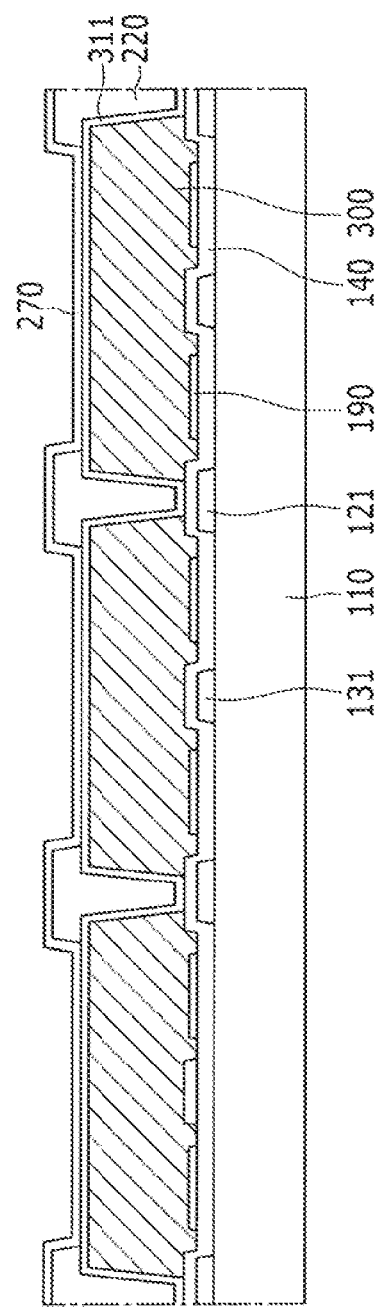

Thereafter, as shown in FIG. 8, the common electrode 270 covering the support layer 311 and the light blocking member 220 is formed. The common electrode 270 is made of a transparent conductive material such as ITO or IZO much like the pixel electrode 190 and serves to control an alignment direction of the liquid crystal molecules 31 by generating an electric field together with the pixel electrode 190.

Figure 9:
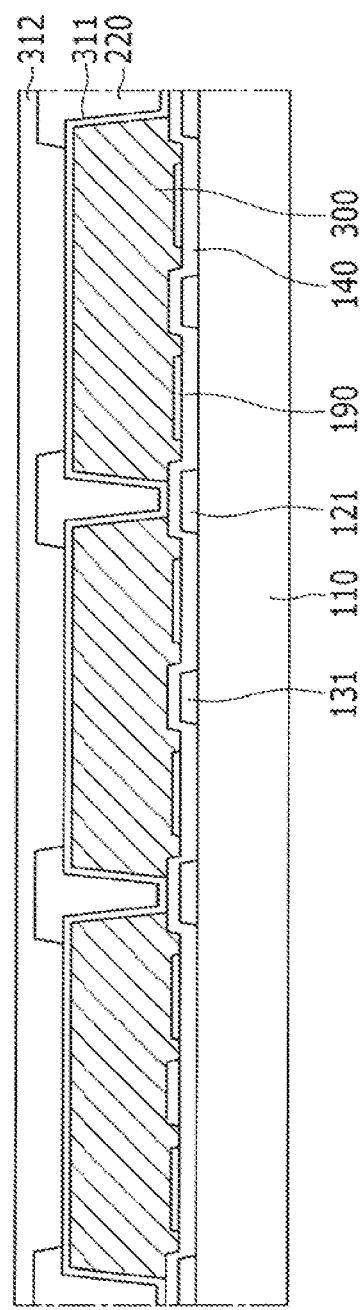

Next, as shown in FIG. 9, a lower flattening layer 312 is formed. The lower flattening layer 312, serves as a layer for removing a step generated on the common electrode 270 due to the light blocking member 220, and may be of an organic material.

Figure 10:
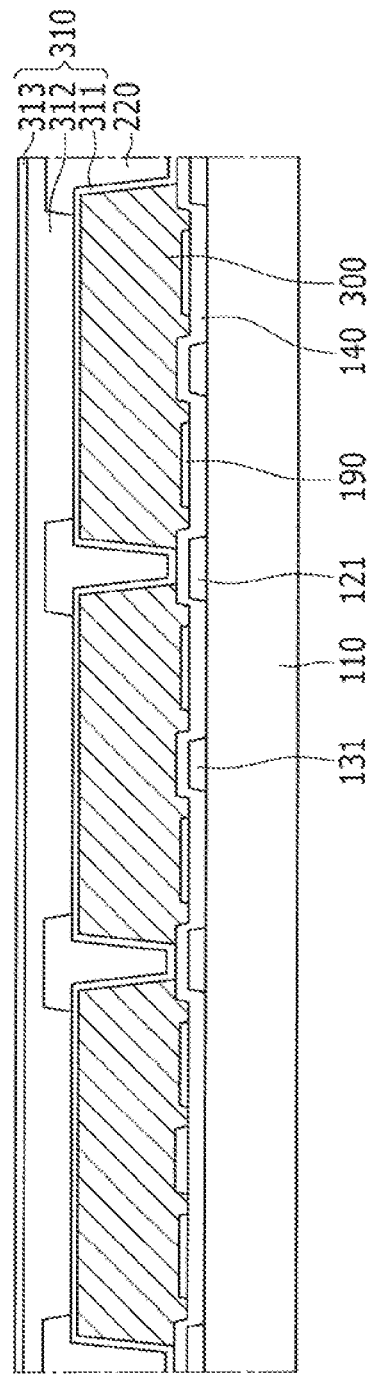

Thereafter, as shown in FIG. 10, a patterned insulating layer 313 is formed on the lower flattening layer 312. The patterned insulating layer 313 forms a liquid crystal injection hole (see 335 of FIG. 14) by patterning a silicon nitride (SiNx) layer laminated together with the lower flattening layer 312 and the support layer 311 after depositing an inorganic insulating material such as silicon nitride (SiNx) and the like at about 2000 Å.

Figure 11:
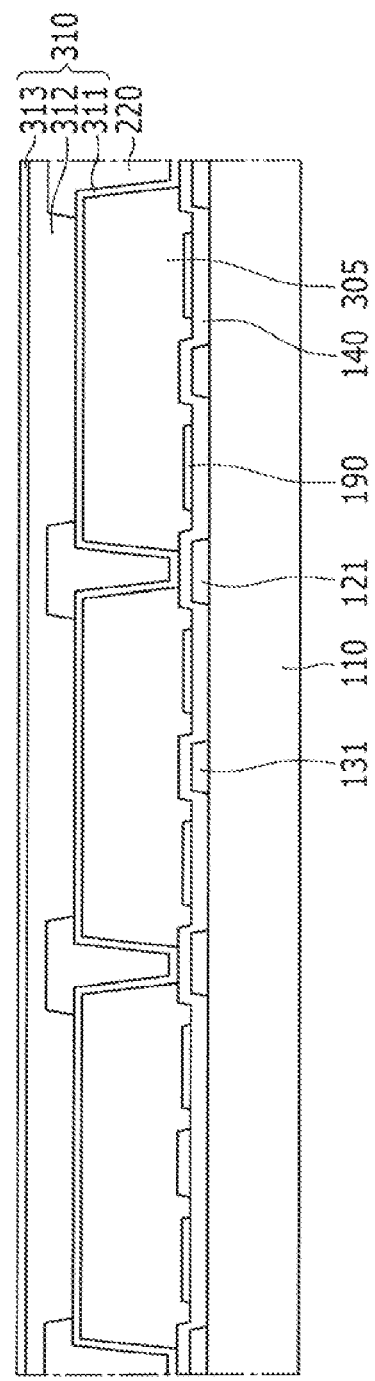

Next, as shown in FIG. 11, a microcavity 305 supported by the support layer 311 is formed by supplying an etchant through the liquid crystal injection hole to remove the sacrificial layer 300 disposed in the support layer 311. The process described above may be performed through a wet etching method in which the lower panel 100 manufactured in FIGS. 1 to 10 is soaked in an etchant such as a photoresist (PR) stripper for a predetermined time.

Figure 12:
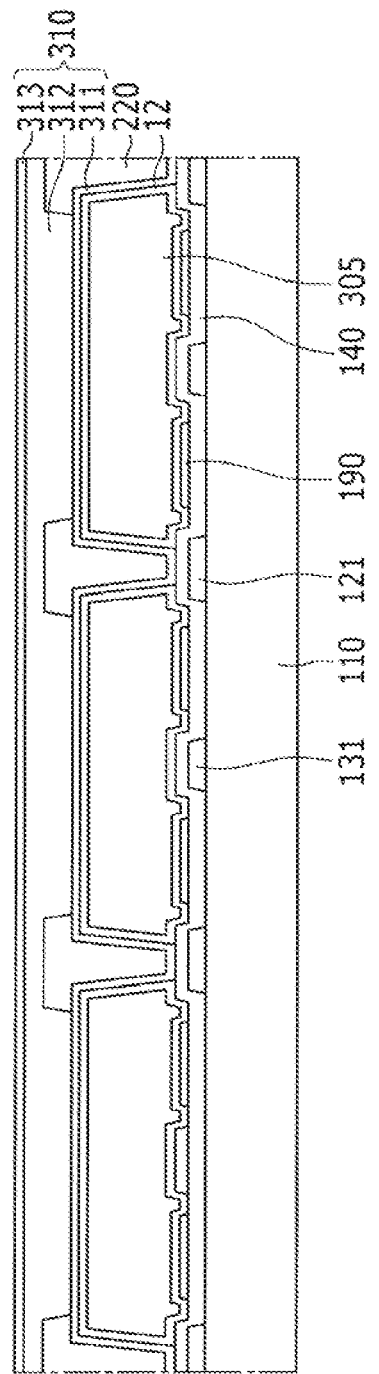

Thereafter, as shown in FIG. 12, an alignment layer 12 is formed in the microcavity 305. In a method of forming the alignment layer 12 in the microcavity 305, when a liquid aligning agent is fully filled in the microcavity 305 through the liquid crystal injection hole by an Inkjet or spin coating method and then cured at a temperature of about 210 degrees for about 1 hour, a solvent included in the aligning agent is volatilized and only polyimide (PI) is cured on the inner surface of the support layer 311 to form the alignment layer 12. The rest of the aligning agent is discharged and removed through the liquid crystal injection hole.

Figure 13:
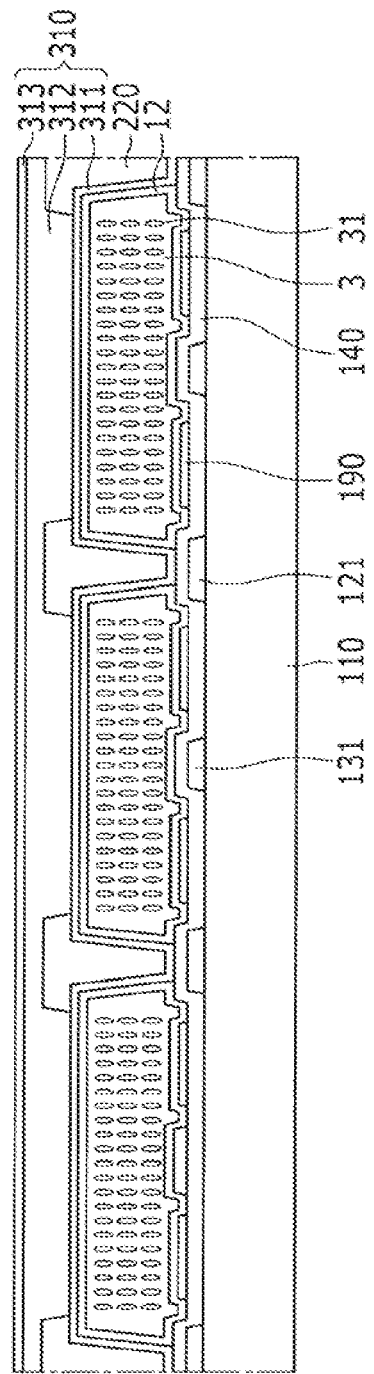

Next, as shown in FIG. 13, the liquid crystal layer 3 is filled in the microcavity 305 utilizing the alignment layer 12 as a wall. In a method of filling the liquid crystal layer 3 in the microcavity 305, liquid crystal material is supplied by a spin coating or inkjet method and the liquid crystal material is injected into the microcavity 305 by surface energy of silicon nitride (SiNx) constituting the support layer 311 and the patterned insulating layer 313 and interaction of a capillary force generated in the liquid crystal injection hole. The injected liquid crystal molecules 31 are aligned in a predetermined direction by the alignment layer 12. The thickness of the injected liquid crystal layer 3 may be formed to be about 5 to 6 µm.

Figure 14:
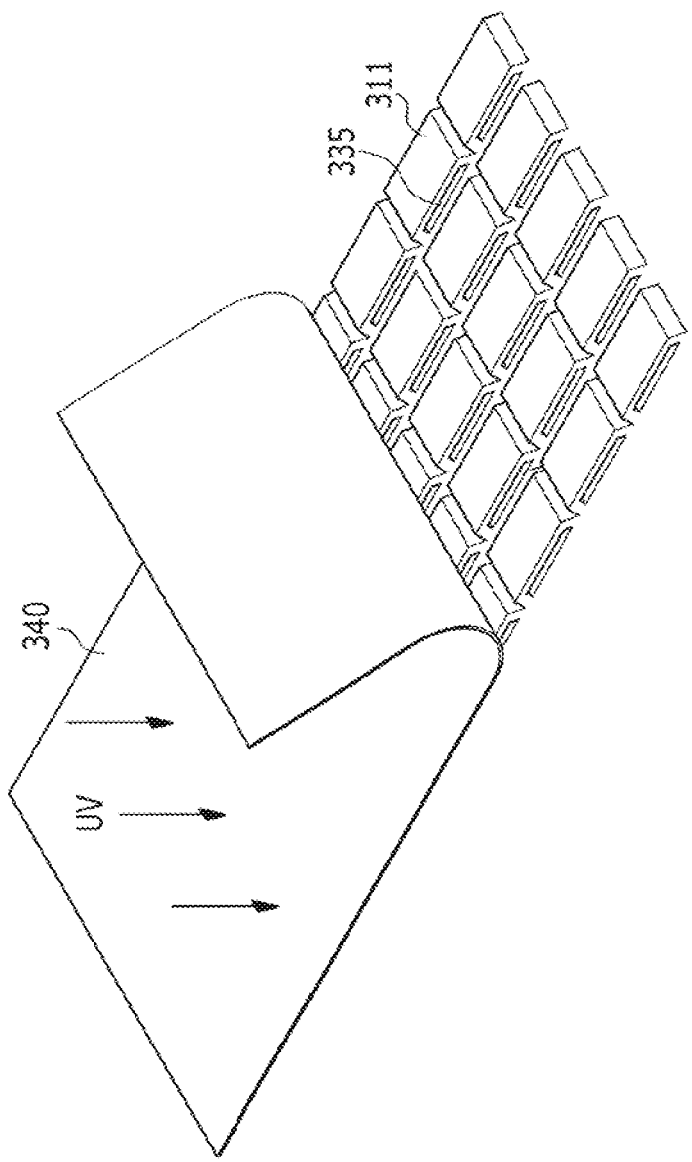

Thereafter, as shown in FIG. 14, to block the liquid crystal injection hole 335 from the outside, a coating layer 340 is formed on the lower panel 100 through ultraviolet slit coating. The coating layer 340 is formed by a method of irradiating ultraviolet rays while slit-coating a transparent organic material and as a result, the liquid crystal injection hole 335 is blocked. The coating layer 340 shown in FIG. 14 may not be needed if a separate structure is formed which blocks the liquid crystal injection hole 335 from the outside.

Next, referring back to FIG. 3, the upper polarizer 21 is formed above the coating layer 340. The upper polarizer 21 may be thinly formed and have a thickness of 100 to 200 µm. The upper polarizer 21 includes a polarization element generating polarization and a tri-acetyl-cellulose (TAC) layer for ensuring durability.

Further, as shown in FIG. 1, the lower polarizer 11 is attached to the rear surface of the substrate 110. The lower polarizer 11 may include a polarization element generating polarization and a tri-acetyl-cellulose (TAC) layer for ensuring durability.

The lower panel 100 is completed by the method as described above. Since all of the liquid crystal layer 3, the common electrode 270, the alignment layer 12, the pixel electrode 190, the lower polarizer 11, and the upper polarizer 21 are included in the completed lower panel 100, all basic operations as the liquid crystal display can be performed by the lower panel 100. However, since the lower panel 100 does not include a color filter 230 capable of displaying a color, the color cannot be displayed and thus hereinafter, the lower panel 100 is also referred to as a black and white liquid crystal display panel.

The upper panel 200 having the color filter 230 will now be described in detail with reference to FIGS. 1, 2, and 15.

Figure 15:
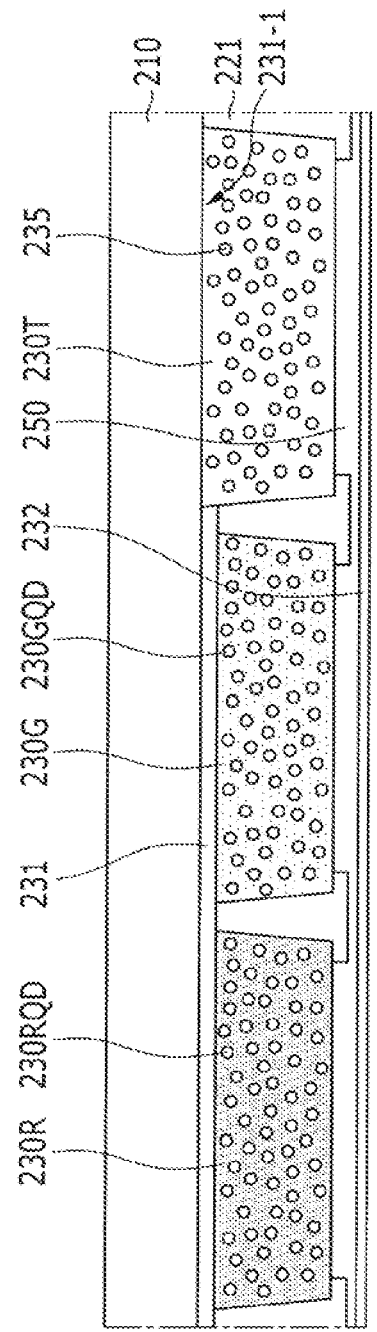
FIG. 15 is a cross-sectional view of an upper panel in the liquid crystal display according to the exemplary embodiment of FIG. 1.

FIG. 15 is a cross-sectional view of an upper panel in the liquid crystal display according to the exemplary embodiment of FIG. 1.

An upper panel 200 is disposed on the upper polarizer 21.

Referring to FIGS. 1 and 2, in the upper panel 200, the blue light blocking layer 231 is formed below the upper substrate 210 made of transparent glass, plastic, or the like. The blue light blocking layer 231 is not formed only in a pixel area displaying blue because an opening 231-1 is included and is formed in pixel areas displaying red and green. The blue light blocking layer 231 may be formed by alternately laminating at least two layers having different refractive indexes, such that wavelengths other than a blue wavelength band are transmitted while the blue wavelength band being blocked. The blocked blue wavelength is reflected and thus a light recycle may also be performed. Since the blue light blocking layer 231 serves to block light emitted from a blue light source, such as blue light source 510 of FIG. 1, from being directly emitted outside, the blue light blocking layer 231 is not formed only in the pixel area displaying blue and is formed in pixel areas displaying red and green.

In the exemplary embodiment of the present invention, since blue light is used as a light source, the opening 231-1 is formed in the pixel area displaying blue. However, a red or green light source may be used according to an exemplary embodiment, and in this case, the opening is formed in the pixel area displaying the corresponding color.

An upper light blocking member 221 is formed below the upper substrate 210 and below the blue light blocking layer 231. The upper light blocking member 221 also has an opening, and a color filter corresponding to a color displayed in the corresponding pixel is formed.

First, a red color filter 230R is formed in a red pixel, a green color filter 230G is formed in a green pixel, and a transparent color filter 230T is formed in a blue pixel. The reason for using the transparent color filter 230T in the blue pixel is because a blue light source is used as the light source 510 of the backlight 500 in the exemplary embodiments of FIGS. 1 and 2.

The red color filter 230R may include red quantum dot (QD) particles 230RQD, and converts light having a wavelength supplied by the blue light source 510 into red. Further, the green color filter 230G may include green quantum dot (QD) particles 230GQD and converts light having a wavelength supplied by the blue light source 510 into green.

In addition, the transparent color filter 230T includes scattering particles 235 which do not convert a wavelength of light having a wavelength supplied by the blue light source 510 but merely changes the direction of light. The scattering particles 235 may be particles such as TiO2 and the like, and the sizes thereof may correspond with the sizes of the red quantum dot (QD) particles 230RQD or the green quantum dot (QD) particles 230GQD.

In the exemplary embodiment of the present invention, since light supplied by the light source 510 of the backlight is scattered in the red quantum dot (QD) particles 230RQD, the green quantum dot (QD) particles 230GQD, and the scattering particles 235 and then emitted outside to display an image, the direction of light emitted outside is wide and grays of the light are not changed according to position, such that the light may have a wide viewing angle.

In the color filter 230, pixels having the same color may be disposed in a column direction elongated along a column of the pixel electrode 190 shown in FIG. 2, and are not limited to three primary colors of red, green, and blue according to an exemplary embodiment and may also display one of cyan, magenta, yellow, and white based colors.

As seen in FIG. 2, an upper flattening layer 250 is formed below the upper light blocking member 221, the red color filter 230R, the green color filter 230G, and the transparent color filter 230T. The upper flattening layer 250 may be made of an organic material and may also be omitted in an exemplary embodiment.

A blue light transmitting layer 232 is formed below the upper flattening layer 250 and formed even in the pixel displaying blue unlike the blue light blocking layer 231. That is, the blue light transmitting layer 232 is formed in the entire area of the upper panel 200. The blue light transmitting layer 232 may be formed by alternately laminating at least two layers having different refractive indexes, and transmits only the blue wavelength band and blocks other wavelength bands. The light of the blocked wavelength band is reflected and thus a light recycle may be performed. The blue light transmitting layer 232 transmits blue light inputted from the blue light source 510 as it is, and is formed such that other unnecessary wavelengths are blocked.

The lower panel 100 is disposed below the blue light transmitting layer 232, and the upper polarizer 21 and the blue light transmitting layer 232 of the upper panel 100 are attached to each other. They may be directly attached to each other or may be adhered to each other through a separate adhesive.

A manufacturing method of the upper panel 200 will now be described with reference to FIGS. 16 to 19.

FIGS. 16 to 19 are diagrams illustrating a manufacturing method of the upper panel according to the exemplary embodiment of FIG. 15 in sequence.

Figure 16:
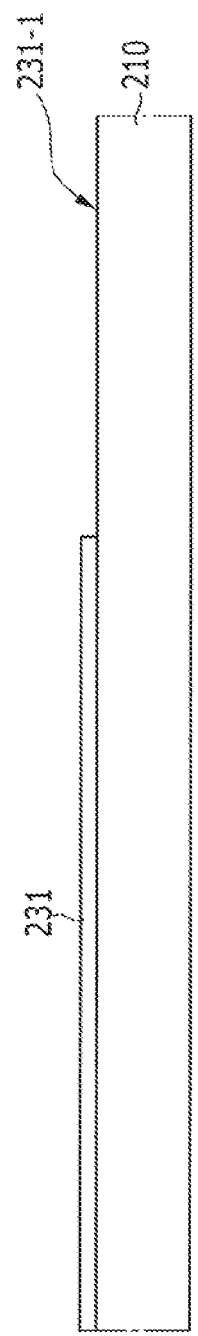
FIGS. 16, 17, 18 and 19 are diagrams illustrating in sequence a manufacturing method of the upper panel according to the exemplary embodiment of FIG. 15.

As shown in FIG. 16, the blue light blocking layer 231 is formed on the upper substrate 210 made of transparent glass, plastic, or the like. The blue light blocking layer 231 has an opening 231-1 and the opening 231-1 is formed only in a pixel area displaying blue. That is, the blue light blocking layer 231 is formed in pixel areas displaying red and green. The blue light blocking layer 231 may be a film formed by alternately laminating at least two layers having different refractive indexes, and is attached on the lower surface of the upper substrate 210 to be formed. The blue light blocking layer 231 transmits wavelengths other than for the blue wavelength band and blocks the blue wavelength band. The blocked blue wavelength is reflected to perform a light recycle.

Figure 17:
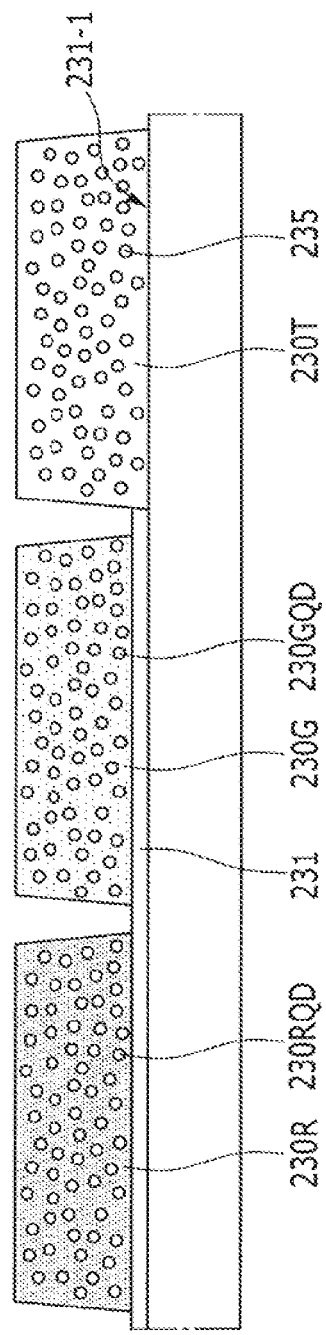

Thereafter, as shown in FIG. 17, the respective color filters 230 are formed to be below the upper substrate 210 exposed by the blue light blocking layer 231 and the opening 231-1. The manufacturing process of the color filter 230 forms three separate color filters.

First, a method of forming the red color filter 230R in a red pixel will be described.

The red color filter 230R is formed by laminating a material including a plurality of red quantum dot (QD) particles 230RQD which change blue light to red light in a transparent organic material or a transparent photoresist and leaving the material only in the red pixel area to perform patterning.

Thereafter, the green color filter 230G is formed by laminating a material including a plurality of green quantum dot (QD) particles 230GQD which change blue light to green light in the transparent organic material or the transparent photoresist and leave the material only in the green pixel area to perform patterning.

Next, the transparent color filter 230T is formed by laminating a material including the scattering particles 235 which disperse incident light in the transparent organic material or the transparent photoresist and leave the material only in the blue pixel area to perform patterning. The scattering particles 235 are sufficient so long as the scattering particles 235 are particles dispersing the light, and, as an example, $TiO_2$ particles are included.

Figure 18:
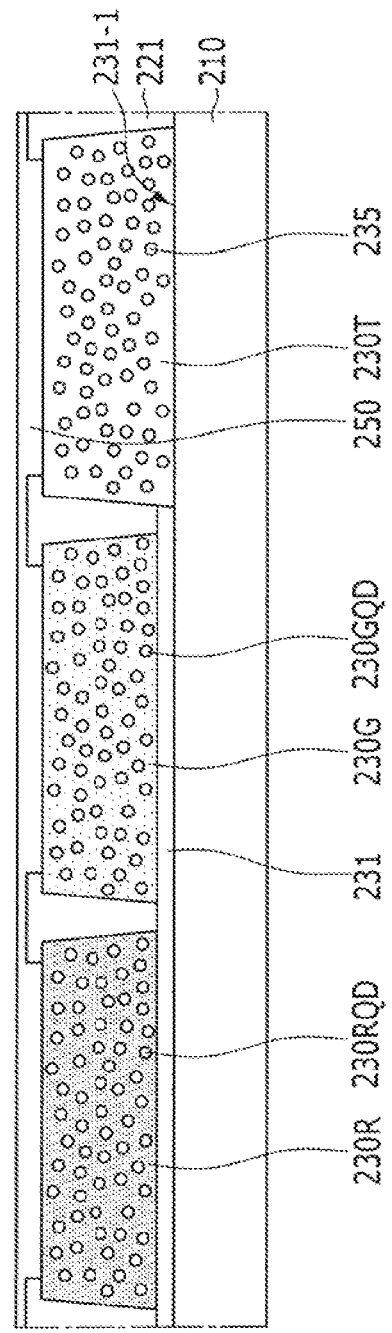

Thereafter, as shown in FIG. 18, the upper light blocking member 221 is formed between the adjacent color filters 230. The upper light blocking member 221 has an opening and the color filters 230 are disposed at the respective openings. The upper light blocking member 221 includes a material which does not transmit light. As shown in FIG. 18, the upper flattening layer 250 is formed on the upper light blocking member 221, the red color filter 230R, the green color filter 230G, and the transparent color filter 230T. The upper flattening layer 250 may be made of an organic material.

Figure 19:
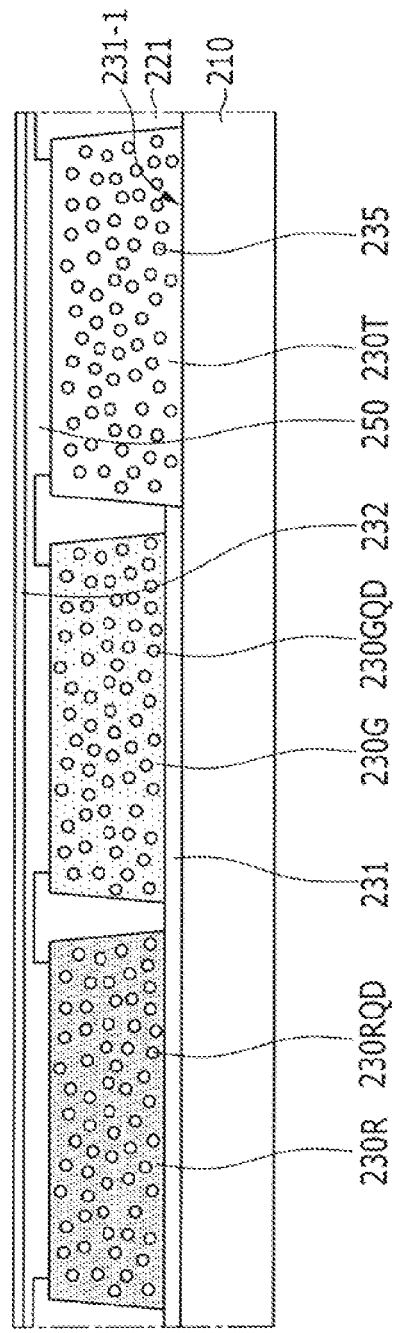

Next, as shown in FIG. 19, the blue light transmitting layer 232 is formed on the upper flattening layer 250. The blue light transmitting layer 232 may also be a film formed by alternately laminating at least two layers having different refractive indexes. The blue light transmitting layer 232 is formed even in the pixel displaying blue, unlike the blue light blocking layer 231, to be attached to the entire area of the upper panel 200. The blue light transmitting layer 232 transmits only the blue wavelength band and blocks other wavelength bands. The light of the blocked wavelength band is reflected to perform a light recycle. The blue light transmitting layer 232 may also have a hermetic sealing characteristic.

Thereafter, as shown in FIG. 2, the lower panel 100 is attached below the blue light transmitting layer 232. The upper polarizer 21 of the lower panel 100 and the blue light transmitting layer 232 of the upper panel 200 may be directly attached to each other or may also be adhered to each other through a separate adhesive.

Referring back to FIG. 1, the backlight unit 500 is disposed below the lower polarizer 11, and the backlight unit includes the blue light source 510 and the light guide plate 520. A plurality of optical films (not shown) may be formed above the light guide plate 520 and below the lower polarizer 11.

Further, in the exemplary embodiment of FIG. 1, the blue light source 510 is disposed at one side of the light guide plate 520, but may be disposed below the lower surface of the light guide plate 520.

As described above, according to the liquid crystal display, a black and white liquid crystal panel formed on the lower panel 100 has a relatively thin thickness as compared with a typical black and white liquid crystal panel. In the case of the typical liquid crystal panel, the upper polarizer 21 is included as it is, and a transparent substrate such as glass is included to further have a thickness as thick as the thickness of the substrate. As a result, in the liquid crystal display according to the exemplary embodiment of the present invention, a distance between the color filter 230 of the upper panel 200 and the liquid crystal layer 3 of the lower panel 100 is small as compared with the typical liquid crystal display, such that the likelihood of a display deterioration due to parallax is low.

Further, the liquid crystal display according to the exemplary embodiment of the present invention has a wide viewing angle characteristic because the direction of the light is wider by using the quantum dot (QD) color filter 230.

As described above, display characteristics according to the exemplary embodiment of the present invention will be described with reference to FIGS. 20 to 33.

FIGS. 20 to 31 are graphs showing characteristics of the liquid crystal display according to an exemplary embodiment of the present invention.

First, a viewing angle characteristic of a liquid crystal display according to an exemplary embodiment of the present invention will be described with reference to FIGS. 20 and 21.

Figure 20:
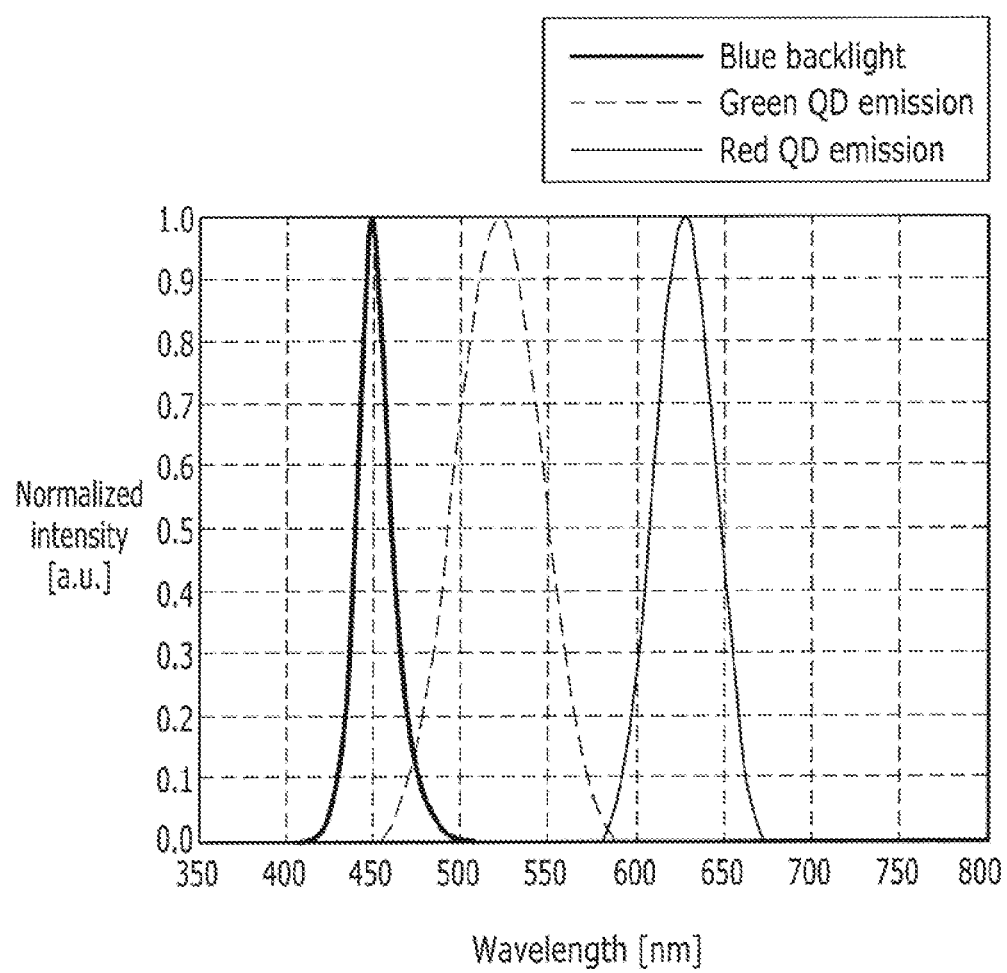
Figure 21:
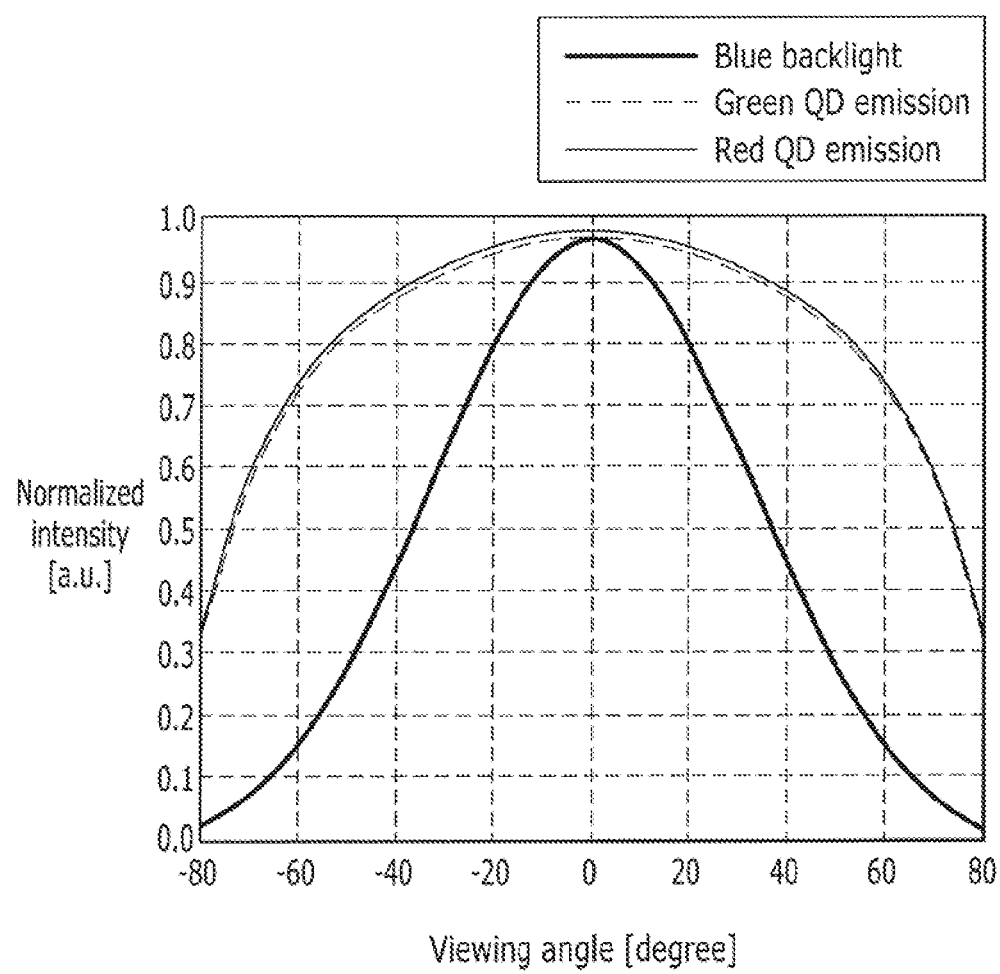

FIG. 20 shows a wavelength spectrum of blue light and a spectrum of light with a changed wavelength by passing through the red color filter 230R and the green color filter 230G respectively, and FIG. 21 shows a viewing angle characteristic of blue light emitted from the backlight and a viewing angle characteristic of light passing through the red color filter 230R and the green color filter 230G respectively.

First, as shown in FIG. 20, light emitted from the blue light source 510 of the backlight unit 500 has a normalized intensity value based on a wavelength of 450 nm. Further, light passing through the red color filter 230R and the green color filter 230G has an adjacent normalized intensity value based on a wavelength of 630 nm and an adjacent normalized intensity value based on a wavelength of 530 nm, respectively. Since each normalized intensity value is a wavelength value representing blue, red, or green, in the liquid crystal display according to the exemplary embodiment of the present invention, the colors are displayed based on the corresponding wavelength.

Further, the liquid crystal display according to the exemplary embodiment of the present invention has a wide viewing angle because light supplied from the blue light source 510 is refracted and dispersed on the red quantum dot (QD) particles 230RQD, the green quantum dot (QD) particles 230GQD, and the scattering particles 235 to the outside.

FIG. 21 shows viewing angles of light supplied from the blue light source 510 and light which transmits from the red color filter 230R and the green color filter 230G. In the light which transmits from the red color filter 230R and the green color filter 230G, while the direction of the light is changed in the red quantum dot (QD) particles 230RQD and green quantum dot (QD) particles, the light flowing to the side increases and as a result, as shown in FIG. 21, luminance of about 70% to maximum luminance may be shown even at 60 degrees left and right. While light of the blue light source 510 is also shown in FIG. 21 and the viewing angle looks narrow, but actually, since the light transmitting from the transparent color filter 230T is refracted and dispersed by the scattering particles 235, the light has a viewing angle similar to the red and green light of FIG. 21. That is, in the typical liquid crystal display, the direction of light supplied from the light source is not changed, but in the case of using the color filter 230 including a phosphor as in accordance with the exemplary embodiment of the present invention, the direction of the light is changed due to the phosphor (quantum dot particles, scattering particles, or the like), thereby improving the viewing angle at the side.

Hereinafter, light characteristics of the blue light transmitting layer 232 and the blue light blocking layer 231 will be described with reference to FIGS. 22 and 23.

Figure 22:
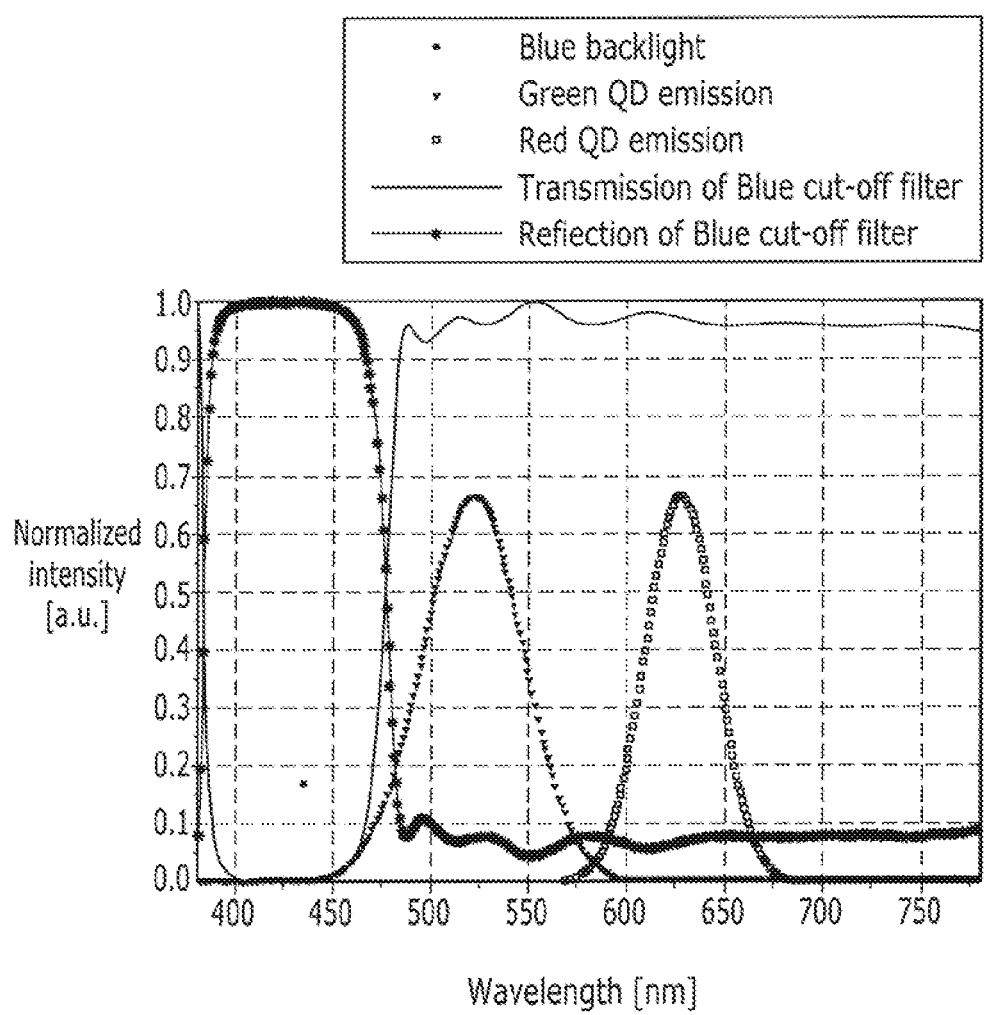

First, FIG. 22 shows characteristics of the blue light blocking layer 231. Since the blue light blocking layer 231 blocks the blue light, the blue light blocking layer 231 has a characteristic in which the blue light is not transmitted and reflected. That is, in FIG. 22, transmission and reflection of the blue light blocking layer 231 are shown together with a wavelength spectrum corresponding to each color. As a result, the blue light blocking layer 231 transmits the red and green lights, but blocks and reflects the blue light.

Figure 23:
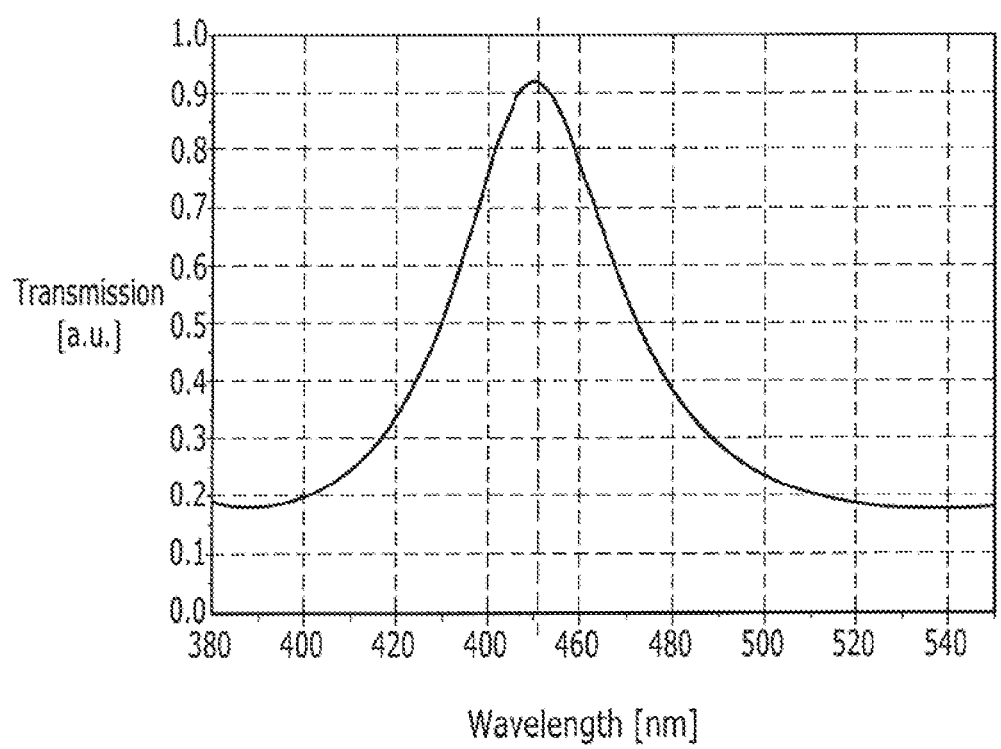

Referring now to FIG. 23, a transmission characteristic of the blue light transmitting layer 232 is shown. In FIG. 23, a characteristic of transmitting adjacent light based on 450 nm is shown. Other light of red and green wavelengths are blocked.

On the basis of the characteristics of FIGS. 22 and 23, each of the blue light blocking layer 231 and the blue light transmitting layer 232 which are used in the exemplary embodiment of the present invention blocks the blue light so that light of the blue wavelength is not included at a place where the red and green are displayed, and components other than the blue light supplied from the light source are blocked, thereby improving purity of light applied to the color filter 230.

Hereinafter, a method of preventing a display deterioration due to parallax of the light in the liquid crystal display according to the exemplary embodiment of the present invention will be described in detail with reference to FIGS. 24 to 31.

Figure 24:
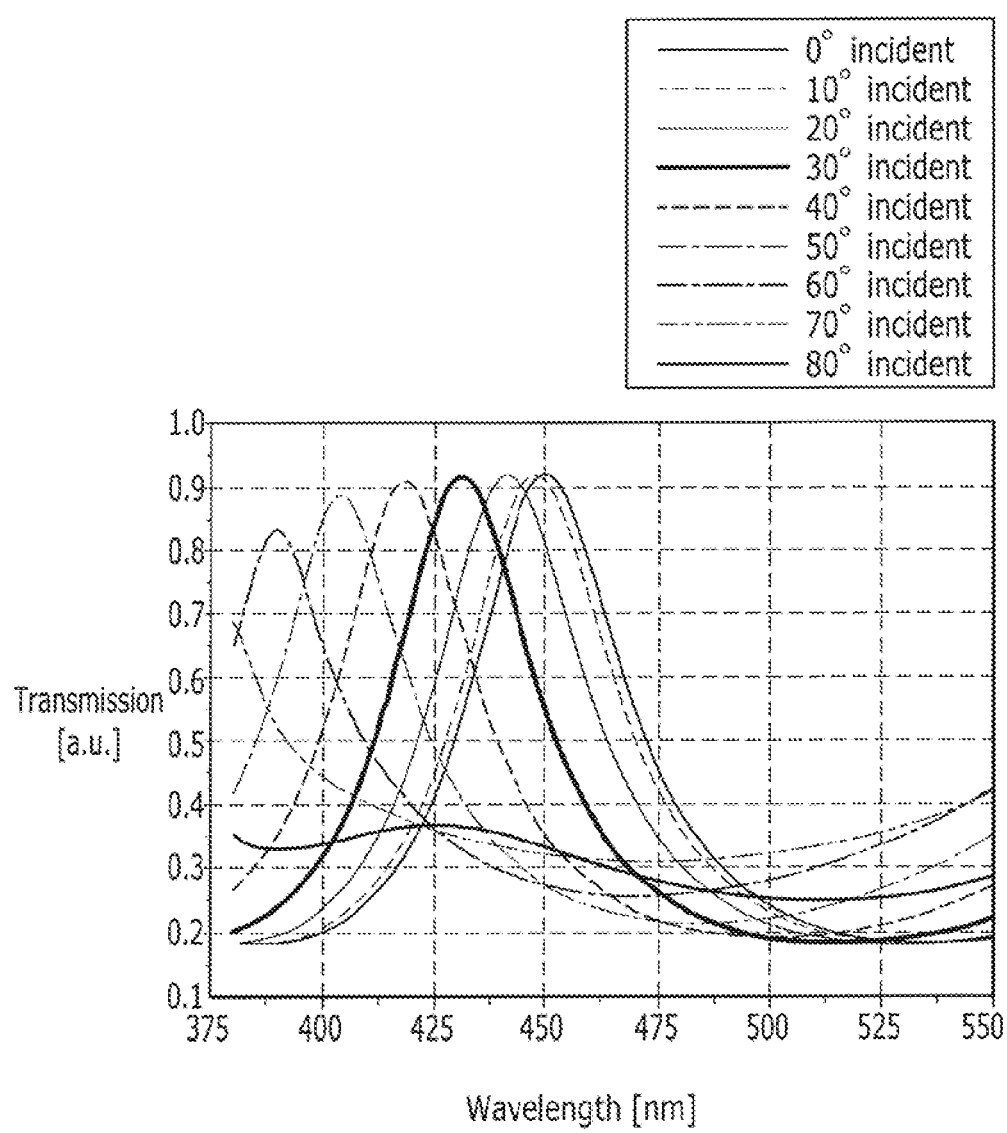
Figure 25:
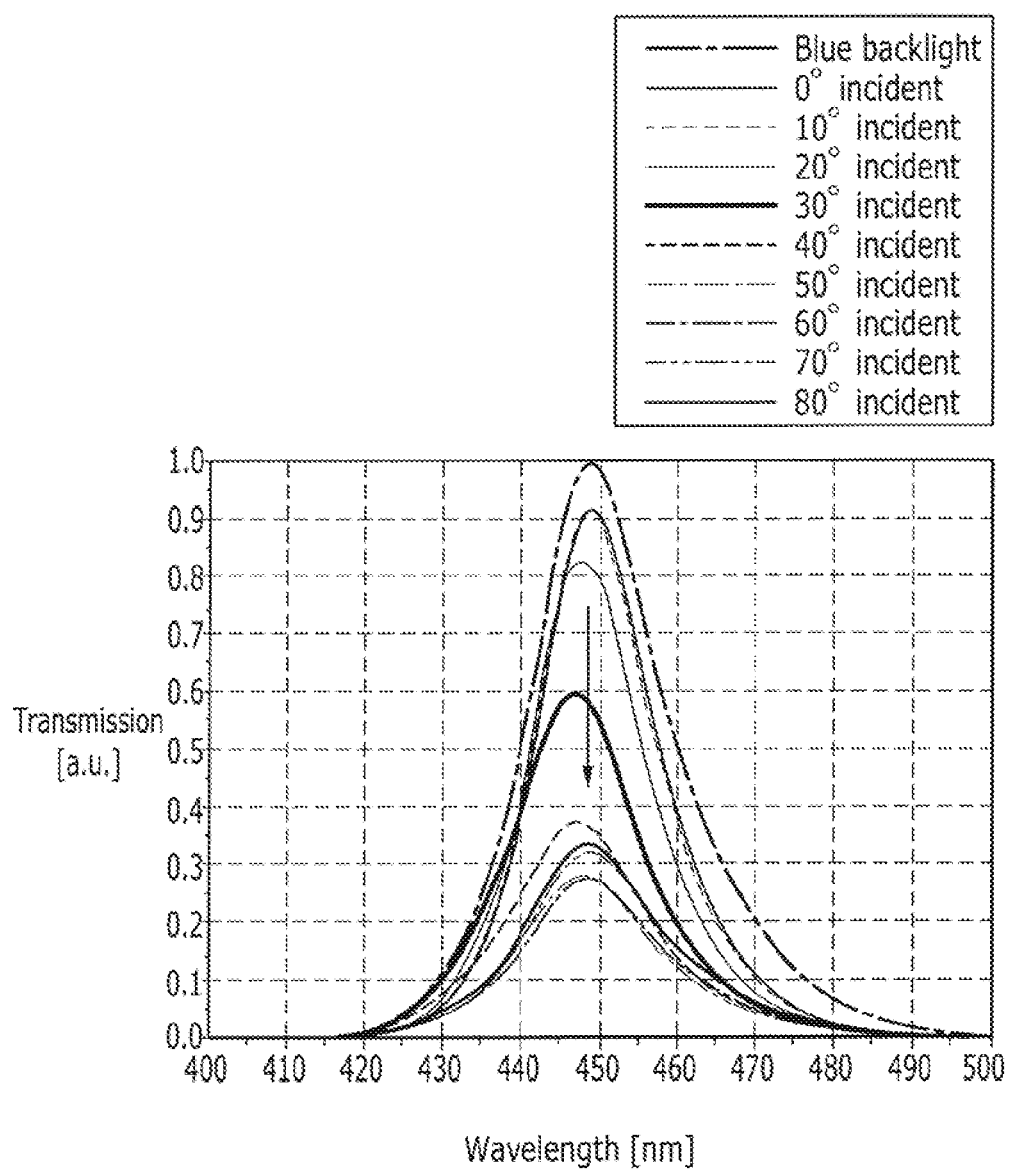

First, in FIGS. 24 and 25, a characteristic of transmitting light according to an incident angle when the blue light is inputted to the blue light transmitting layer 232 of the upper panel 200 is shown.

In FIGS. 24 and 25, in the case of the incident angle of 0 degree, the blue light is vertically inputted to the blue light transmitting layer 232, and in the case of the incident angle of 80 degrees, the blue light is inputted at an angle of 80 degrees to a vertical normal to the blue light transmitting layer 232.

In FIG. 24, wavelength variation of the transmitting light according to an incident angle is shown, and in FIG. 25, transmission of the blue light according to an incident angle is shown.

In FIG. 24, in the case of an incident angle of 0 degree, a wavelength of incident light maintains the blue wavelength band as it is, but as the incident angle increases, the wavelength of the incident light is relatively shorter so as not to be transmitted in the blue light transmitting layer 232. As a result, only light which is vertically (incident angle of 0 degree) inputted to the blue light transmitting layer 232 is transmitted, and in the case where the incident angle is large, light is not transmitted but reflected in the blue light transmitting layer 232 to be used for the light recycle. Further, in FIG. 25, in the case of the incident angle of 0 degree, 90% of light emitted from the blue light source 510 of the backlight unit 500 is transmitted, but as the incident angle increases, the transmission of the transmitted light decreases and the remaining light is reflected.

As described above, due to the characteristic of the blue light transmitting layer 232, only the blue light is transmitted and other wavelength light (light which are obliquely inputted at a predetermined angle or more) are reflected and thus only the same light as vertical light is inputted to the color filter 230, such that the display deterioration due to parallax does not occur. That is, the parallax is generated when the light transmitting from the adjacent pixel is inputted to the color filter 230 of the corresponding pixel, and the light is obliquely inputted to the blue light transmitting layer 232 so as not to transmit through the blue light transmitting layer 232, thereby preventing the display deterioration due to parallax.

Parallax will now be described in more detail with reference to FIGS. 26 to 31.

Figure 26:
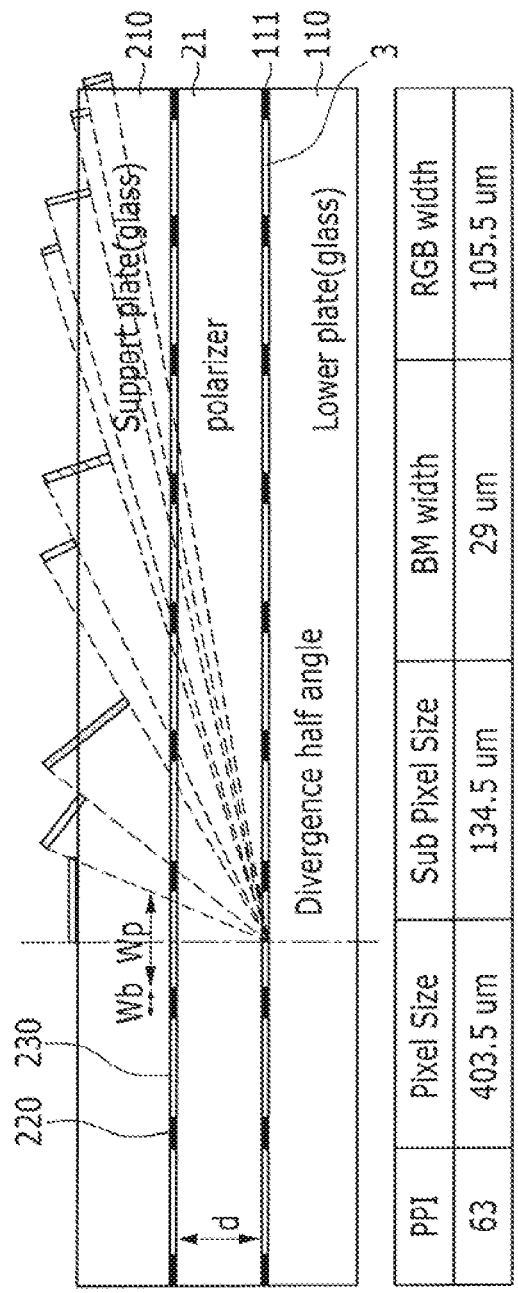

In FIG. 26, in order to clearly describe parallax, a circumferential layered relationship is shown. Various cases where light passing through the liquid crystal layer 3 of the lower panel 100 passes through the upper polarizer 21 to be inputted to the color filter 230 are shown, and an expressed color is changed depending on the color of the passed color filter 230. That is, there is no problem in the case where the light passes through the color filter 230 of the corresponding pixel, but in the case where the light progresses to the side, while the light passes through the adjacent color filter 230, the display deterioration due to parallax occurs. In the exemplary embodiment of the present invention, the display deterioration due to parallax is somewhat prevented by the blue light transmitting layer 232, but a value capable of preventing the display deterioration due to parallax regardless of the blue light transmitting layer 232 will be calculated.

In the exemplary embodiment shown in FIG. 26, a width of the color filter 230 represented by Wp is 105.5 µm, a width of the light blocking member 220 represented by Wb is 29 µm, a pixel per inch (PPI) is 63, a pixel size is 403.5 µm, and a sub pixel size is 134.5 µm.

Figure 27:
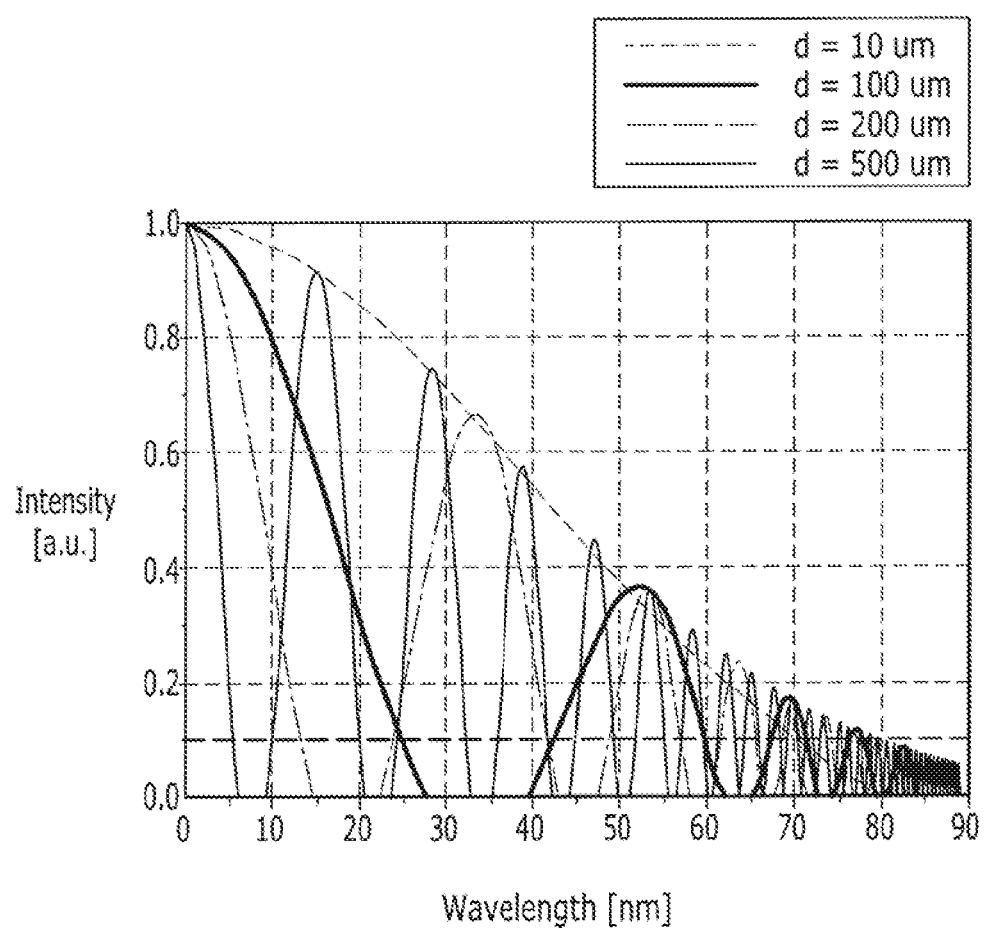
Figure 28:
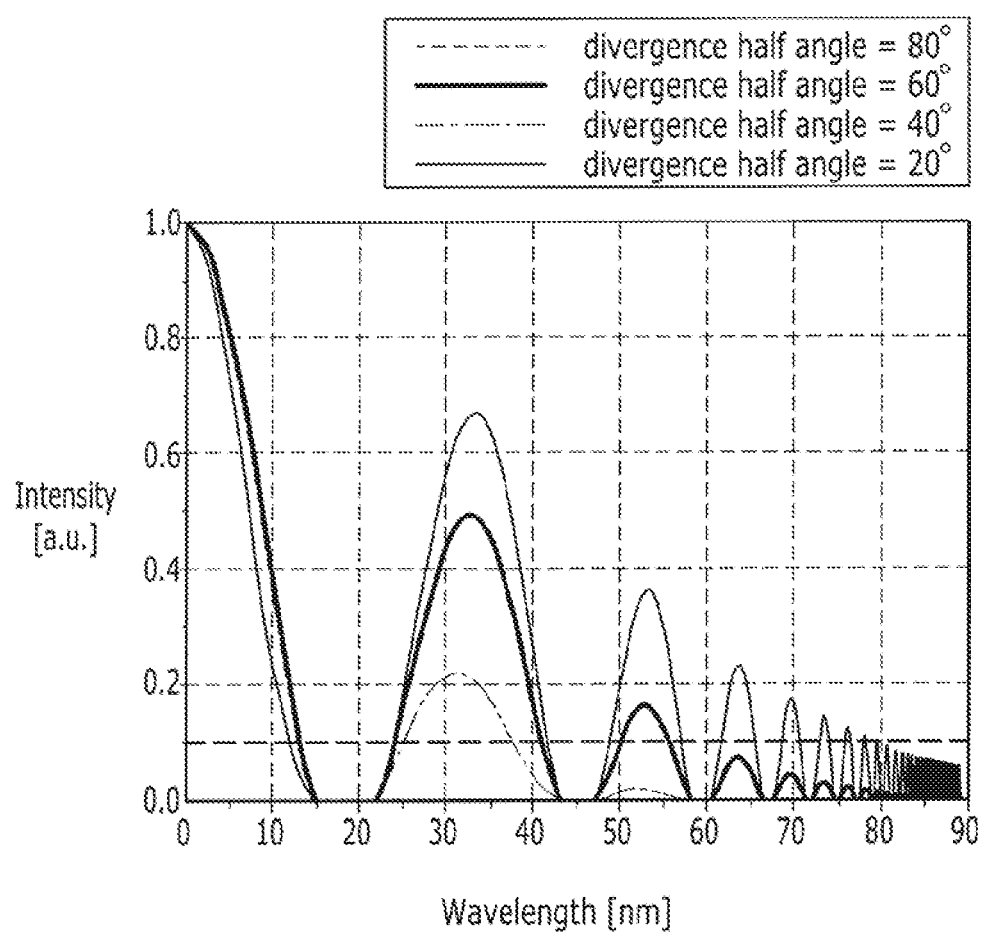

In the exemplary embodiment shown in FIG. 26, characteristics according to a vertical distance d between the color filter 230 and the liquid crystal layer 3 and a divergence half angle are shown in FIGS. 27 and 28.

FIG. 27 shows variation in intensity of light for a viewing angle according to variation in the vertical distance d between the color filter 230 and the liquid crystal layer 3. The case where the intensity of light is 0 means that the light is blocked by the light blocking member 220 in the corresponding viewing angle and thus the case where the intensity of light becomes 0 and then increases again means that the light progresses to the adjacent color filter 230. Therefore, in FIG. 27, it can be seen that the case where the intensity uniformly decreases is only the case where the vertical distance d between the color filter 230 and the liquid crystal layer 3 is 10 µm, and as the vertical distance d between the color filter 230 and the liquid crystal layer 3 is smaller, the likelihood of a display deterioration due to parallax is low.

Further, FIG. 28 shows variation in intensity of the light for a viewing angle according to a divergence half angle in a state where the vertical distance d between the color filter 230 and the liquid crystal layer 3 is fixed to 200 µm. Even in a graph of FIG. 28, since the case where the intensity of light becomes 0 and then increases again means that the light progresses to the adjacent color filter 230, when the intensity uniformly decreases, the display deterioration due to parallax does not occur. In FIG. 28, it is clearly shown that the case where the display deterioration due to parallax does not occur is only the case where the divergence half angle is 20 degrees, and as the divergence half angle decreases, the display deterioration due to parallax likelihood is low.

Figure 29:
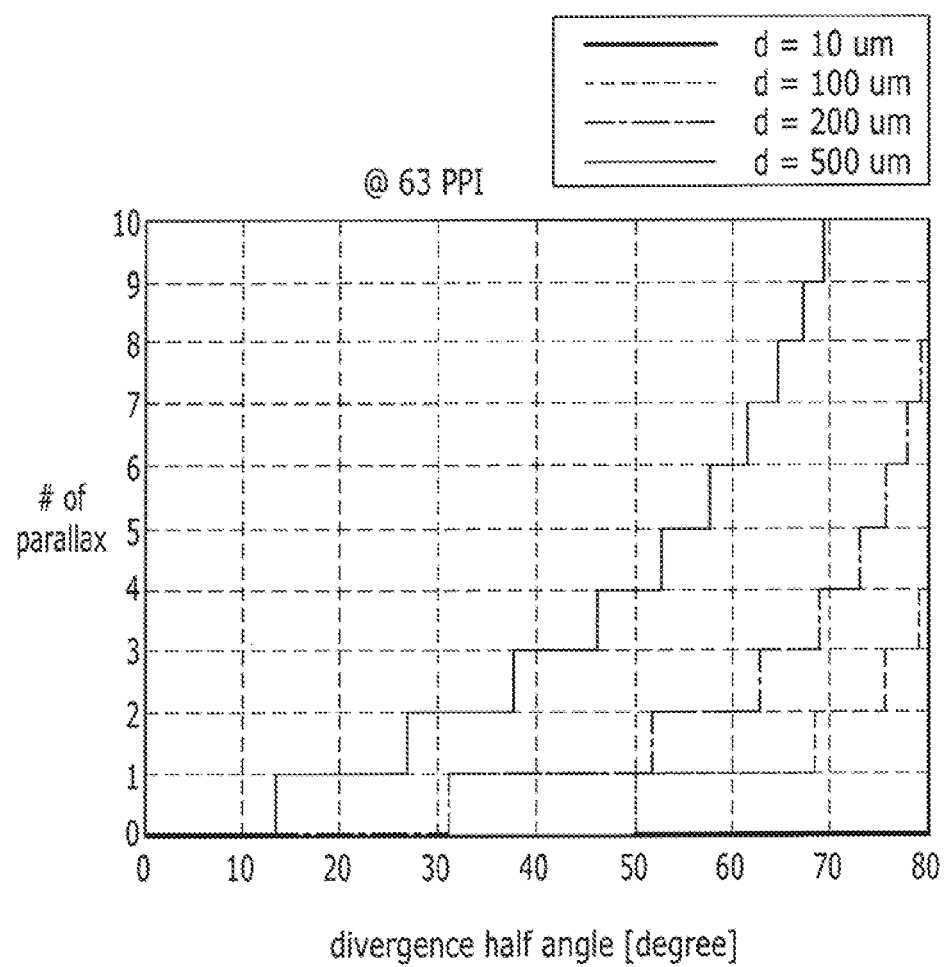
Figure 30:
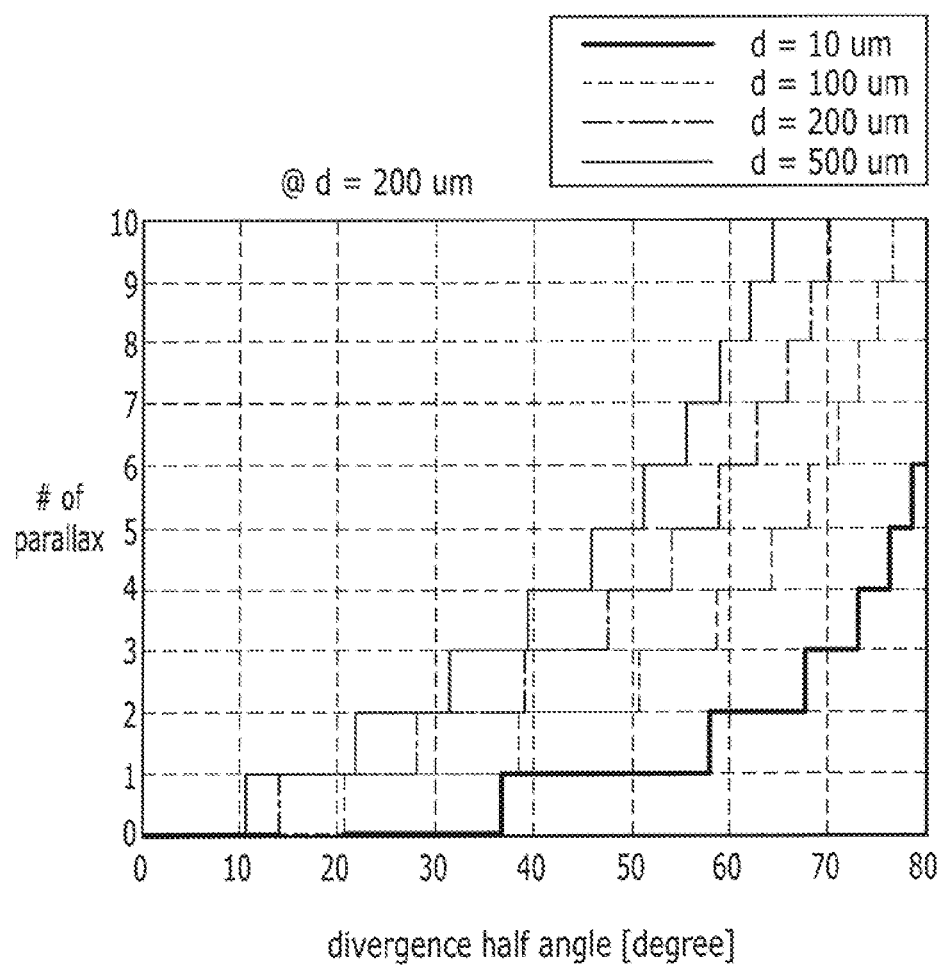

Based on the above description, in FIGS. 29 and 30, occurrence frequency of the parallax according to a divergence half angle is shown.

First, in FIG. 29, in the case where a PPI value is 63, the occurrence frequency of the display deterioration due to parallax is measured by changing the vertical distance d between the color filter 230 and the liquid crystal layer 3. As shown in FIG. 29, the case where the display deterioration due to parallax does not occur is only the case where the vertical distance d between the color filter 230 and the liquid crystal layer 3 is 10 µm.

Further, in FIG. 30, the occurrence frequency of the display deterioration due to parallax is measured by fixing the vertical distance d between the color filter 230 and the liquid crystal layer 3 to 200 µm and changing the pixels per inch (PPI). In FIG. 30, the display deterioration due to parallax occurs in all cases, but as the divergence half angle decreases, the display deterioration due to parallax does not occur regardless of the PPI value, and as the PPI value decreases, the pixel size increases and thus the display deterioration due to parallax occurs less.

In the exemplary embodiment of the present invention, to prevent the display deterioration due to parallax, the vertical distance d between the color filter 230 and the liquid crystal layer 3 becomes smaller. That is, referring to FIG. 2, the upper polarizer 21 has the thickest thickness between the color filter 230 and the liquid crystal layer 3 and the thickness is 100 to 200 µm. Therefore, in the exemplary embodiment of FIG. 2 of the present invention, the vertical distance (d as seen in FIG. 26) between the color filter 230 and the liquid crystal layer 3 is 100 to 200 µm, and in this case, it is advantageous that the vertical distance d is reduced sharply because the insulation substrate is not formed therebetween.

As described above, how much the parallax may be improved by sharply reducing the vertical distance d between the color filter 230 and the liquid crystal layer 3 is shown in FIG. 31.

In FIG. 31, in the case where the divergence half angle is 80 degrees or less and the vertical distance d between the color filter 230 and the liquid crystal layer 3 is 500 µm or less and in the case where the divergence half angle is 55 degrees or less and the vertical distance d between the color filter 230 and the liquid crystal layer 3 is 100 µm or less, whether the display deterioration due to parallax occurs is shown.

As shown in FIG. 31, in the case where the vertical distance d between the color filter 230 and the liquid crystal layer 3 is 500 µm or less, the display deterioration due to parallax occurs several times according to a change of the viewing angle, but in the vertical distance d between the color filter 230 and the liquid crystal layer 3 is 100 µm or less, the display deterioration due to parallax hardly occurs.

As shown in FIG. 31, in the exemplary embodiment of the present invention, only the upper polarizer 21 is formed as a layer having a large thickness between the color filter 230 and the liquid crystal layer 3 and as a result, the distance is sharply reduced and the display deterioration due to parallax is prevented.

Hereinafter, an exemplary embodiment different from the exemplary embodiment of FIGS. 1 and 2 will be described with reference to FIGS. 32 to 35.

First, another exemplary embodiment will be described with reference to FIGS. 32 to 35.

Figure 32:
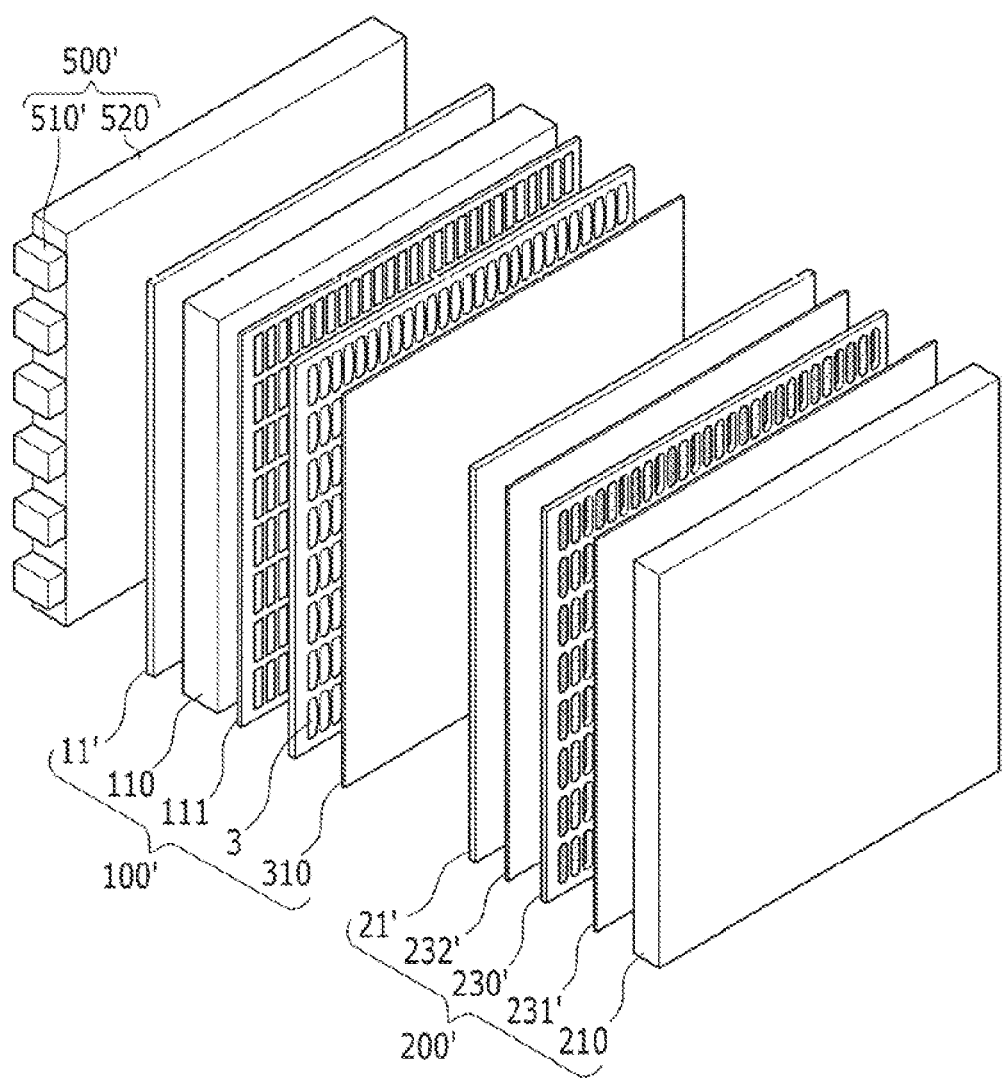
FIG. 32 is an exploded perspective view of a liquid crystal display according to an exemplary embodiment of the present invention.
Figure 33:
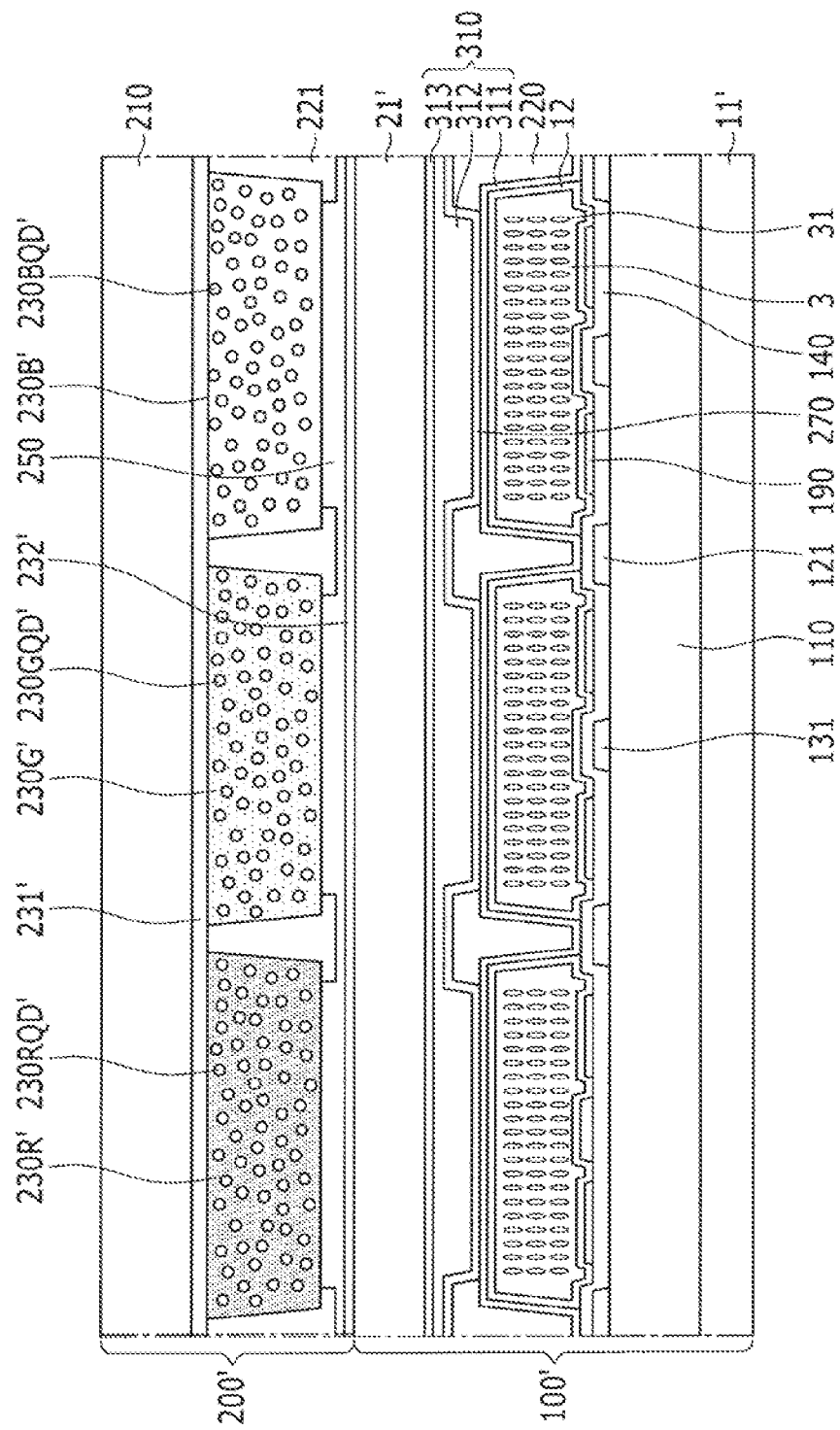
FIG. 33 is a cross-sectional view of the liquid crystal display according to the exemplary embodiment of FIG. 32.

FIG. 32 is an exploded perspective view of a liquid crystal display according to another exemplary embodiment of the present invention and FIG. 33 is a cross-sectional view of the liquid crystal display according to the exemplary embodiment of FIG. 32.

The exemplary embodiment of FIG. 32 includes an ultraviolet rays light source 510' as a light source as compared with the blue light source 510 of the exemplary embodiment of FIG. 1. As a result, polarizers 11' and 21' have a characteristic of polarizing ultraviolet rays, and an ultraviolet rays blocking layer 231' and an ultraviolet rays transmitting layer 232' are included in the upper panel 200'. Further, quantum dot particles included in a color filter 230' change a wavelength of the ultraviolet rays to be changed into red, green, and blue. Further, in the exemplary embodiment of FIG. 32, an upper polarizer 21' is included in the upper panel 200'.

As shown in FIG. 32, a liquid crystal display according to another exemplary embodiment of the present invention includes a lower panel 100', an upper panel 200', and a backlight unit 500'.

The backlight unit 500' includes an ultraviolet rays light source 510' and a light guide plate 520. The lower panel 100' disposed thereon includes a lower polarizer 11', a lower substrate 110, a wiring layer 111, a liquid crystal layer 3 formed in a microcavity, and an upper insulating layer 310. Further, the upper panel 200' disposed thereon includes an upper polarizer 21', an upper substrate 210, an ultraviolet rays blocking layer 231', a color filter 230', and an ultraviolet rays transmitting layer 232'.

As described above, the liquid crystal display according to the exemplary embodiment of FIG. 32 will be described in more detail with reference to FIG. 33.

First, the lower panel 100 will be described with reference to FIG. 33.

A wiring layer 111 including a thin film transistor (not shown) and the like is formed on a substrate 110 made of transparent glass, plastic, or the like. The wiring layer 111 includes a gate line 121, a storage voltage line 131, a gate insulating layer 140, a data line (not shown), a passivation layer (not shown) and a pixel electrode 190, and the thin film transistor is connected to the gate line 121 and the data line. Structures of the pixel electrode 190, the gate line 121, and the data line formed on the wiring layer 111 may vary according to an exemplary embodiment.

The gate line 121 and the storage voltage line 131 are disposed below the gate insulating layer 140 and electrically separated from each other, and the data line crosses and is insulated from the gate line 121 and the storage voltage line 131. The gate electrode on the gate line 121 and the source electrode on the data line provide a control terminal and an input terminal of the thin film transistor, respectively. Further, an output terminal (drain electrode) of the thin film transistor is connected with the pixel electrode 190, and the pixel electrode 190 is insulated from the gate line 121, the storage voltage line 131 and the data line.

A support layer 311 is disposed on the pixel electrode 190 and the passivation layer. The support layer 311 serves to support itself so that an inner portion of the support layer 311, that is, an upper space (hereinafter, referred to as a microcavity (see 305 of FIG. 11)) of the pixel electrode 190 and the passivation layer may be formed. A cross section of the support layer 311 according to the exemplary embodiment may have a trapezoid shape, and have a liquid crystal injection hole on one side thereof in order to inject a liquid crystal in the microcavity 305. The support layer 311 may include an inorganic insulating material such as silicon nitride (SiNx) and the like.

Further, in order to arrange liquid crystal molecules injected in the microcavity 305, an alignment layer 12 is formed at the inside of the support layer 311, that is, at the upper portion of the pixel electrode 190 and the passivation layer. The alignment layer 12 made of at least one of generally used materials such as polyamic acid, polysiloxane, or polyimide, or the like as a liquid crystal alignment layer may be formed.

The liquid crystal layer 3 is formed under the alignment layer 12 of the microcavity 305, and the liquid crystal molecules 31 are initially aligned by the alignment layer 12. A thickness of the liquid crystal layer 3 may be about 5 to 6 μm.

A light blocking member (BM) 220 is formed between the adjacent support layers 311. The light blocking member 220 includes a material which does not transmit light and has an opening, and the opening may correspond to the microcavity 305.

A common electrode 270 is formed on the support layer 311 and the light blocking member 220. The common electrode 270 and the pixel electrode 190 are made of a transparent conductive material such as ITO or IZO and serve to control an alignment direction of the liquid crystal molecules 31 by generating an electric field.

A flattening layer 312 is formed on the common electrode 270. The flattening layer 312, as a layer for removing a step generated on the common electrode 270 due to the light blocking member 220, may include an organic material.

A patterned insulating layer 313 is formed on the flattening layer 312. The patterned insulating layer 313 may include an inorganic insulating material such as silicon nitride (SiNx). The flattening layer 312 and the patterned insulating layer 313 are patterned together with the support layer 311 to form a liquid crystal injection hole 335. The patterned insulating layer 313 may be omitted according to an exemplary embodiment. In FIG. 32, the support layer 311, the flattening layer 312, and the patterned insulating layer 313 are shown as one upper insulating layer 310.

The lower polarizer 11' is attached to the rear surface of the substrate 110. The lower polarizer 11' transmits only one polarization direction of the ultraviolet rays. Further, the lower polarizer 11' may not be thinly formed and includes a polarization element generating polarization and a Tri-acetyl-cellulose (TAC) layer for ensuring durability.

The upper panel 200' will now be described.

The upper panel 200' is disposed on the patterned insulating layer 313.

Referring to FIGS. 32 and 33, in the upper panel 200', the ultraviolet rays blocking layer 231' is formed below the upper substrate 210 made of transparent glass, plastic, or the like The ultraviolet rays blocking layer 231' is formed on all pixel areas displaying blue, red, and green. The ultraviolet rays blocking layer 231' may be formed by alternately laminating at least two layers having different refractive indexes, and wavelengths except for an ultraviolet wavelength band are transmitted and the ultraviolet wavelength band is blocked. The blocked ultraviolet rays are reflected and thus a light recycle may also be performed. The ultraviolet rays blocking layer 231' serves to block light emitted from an ultraviolet rays light source 510' from being directly emitted outside.

An upper light blocking member 221 is formed below the upper substrate 210 and the ultraviolet rays blocking layer 231'. The upper light blocking member 221 also has an opening, and a color filter 230' corresponding to a color displayed in the corresponding pixel is formed.

First, a red color filter 230R' is formed in a red pixel, a green color filter 230G' is formed in a green pixel, and a blue color filter 230B' is formed in a blue pixel. The red color filter 230R' may include red quantum dot (QD) particles 230RQD' and converts light having a wavelength supplied in the ultraviolet rays light source 510' into red.

Further, the green color filter 230G' may include green quantum dot (QD) particles 230GQD' and converts light having a wavelength supplied in the ultraviolet rays light source 510' into green.

In addition, the blue color filter 230B' may include blue quantum dot (QD) particles 230BQD' and converts light having a wavelength supplied in the ultraviolet rays light source 510' into blue.

In the exemplary embodiment of the present invention, since the light supplied in the ultraviolet rays light source 510' of the backlight is converted into red, green, and blue light in the red quantum dot (QD) particles 230RQD', the green quantum dot (QD) particles 230GQD', and the blue quantum dot (QD) particles 230BQD', respectively, and then emitted outside to display an image, the direction of the light emitted outside is wide and grays of the light are not changed according to a viewing position, such that the light may have a wide viewing angle.

An upper flattening layer 250 is formed below the upper light blocking member 221, the red color filter 230R', the green color filter 230G', and the blue color filter 230B'. The upper flattening layer 250 may be made of an organic material and may also be omitted according to an exemplary embodiment.

The ultraviolet rays transmitting layer 232' is formed below the upper flattening layer 250 and formed in all the pixel areas like the ultraviolet rays blocking layer 231'. The ultraviolet rays transmitting layer 232' may also be formed by alternately laminating at least two layers having different refractive indexes, and transmits only the ultraviolet wavelength band and blocks other wavelength bands. The light of the blocked wavelength bands is reflected and thus a light recycle may be performed.

The upper polarizer 21' is disposed below the ultraviolet rays transmitting layer 232'. The upper polarizer 21' transmits only one polarization direction of the ultraviolet rays. Further, the upper polarizer 21' may be thinly formed and have a thickness of 150 to 200 μm. The upper polarizer 21' includes a polarization element generating polarization and a Tri-acetyl-cellulose (TAC) layer for ensuring durability.

The lower panel 100' is disposed below the upper polarizer 21' and the patterned insulating layer 313 which is the uppermost layer of the lower panel 100' and the upper polarizer 21' may be directly attached to each other or may also be adhered to each other through a separate adhesive.

When comparing the exemplary embodiments of FIGS. 1 and 32, the upper polarizers 21, 21' may include the upper panel or the lower panel, the upper panel may be disposed above the upper polarizers 21, 21', and the lower panel may be disposed below the upper polarizers 21 and 21'.

Referring back to FIG. 32, the backlight unit 500' is disposed below the lower polarizer 11, and the backlight unit includes the ultraviolet rays light source 510' and the light guide plate 520. A plurality of optical films (not shown) may be formed above the light guide plate 520 and below the lower polarizer 11.

As described above, in the liquid crystal display, the substrate is not additionally included and thus the thickness is thin. As a result, in the liquid crystal display according to the exemplary embodiment of the present invention, a distance between the color filter 230' of the upper panel 200 and the liquid crystal layer 3 of the lower panel 100 is small as compared with the typical liquid crystal display, such that a the likelihood of display deterioration due to parallax is low.

Further, the liquid crystal display according to the exemplary embodiment of the present invention has a wide viewing angle characteristic because the direction of the light is wider by using the quantum dot (QD) color filter 230'.

Hereinafter, yet another exemplary embodiment will be described with reference to FIGS. 34 and 35.

Figure 34:
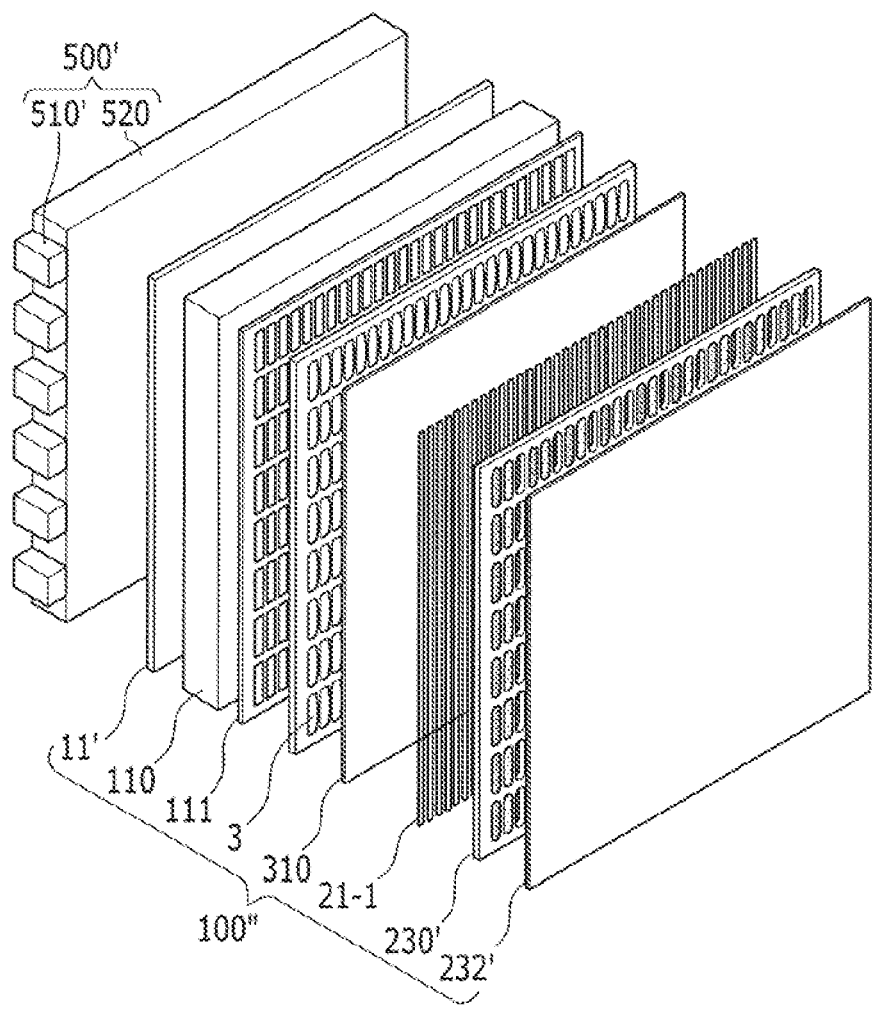
FIG. 34 is an exploded perspective view of a liquid crystal display according to an exemplary embodiment of the present invention.
Figure 35:
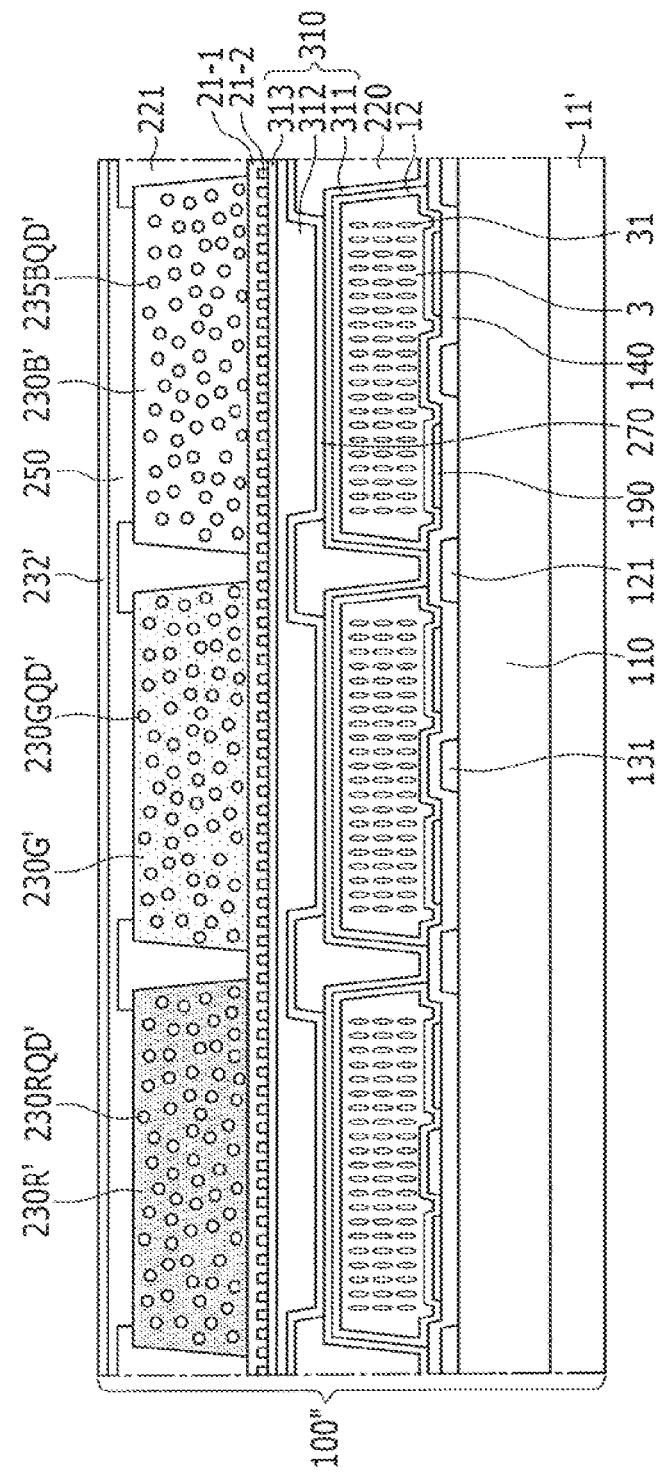
FIG. 35 is a cross-sectional view of the liquid crystal display according to the exemplary embodiment of FIG. 34.

FIG. 34 is an exploded perspective view of a liquid crystal display according to yet another exemplary embodiment of the present invention and FIG. 35 is a cross-sectional view of the liquid crystal display according to the exemplary embodiment of FIG. 34.

The exemplary embodiment of FIGS. 34 and 35 includes an ultraviolet rays light source 510' as a light source unlike the exemplary embodiment of FIG. 1. A lower polarizer 11' has a characteristic of polarizing ultraviolet rays, and an upper polarizer 21-1 has a characteristic of polarizing light because a metal wirings 21-2 such as aluminum and the like are disposed with an interval of 100 nm or less in order to reduce the thickness. In the exemplary embodiment of FIGS. 34 and 35, since the upper polarizer 21 is not formed, but the polarizer including the metal wirings is used, the thickness of the polarizer may be decreased to about 5 to 10 μm, thereby largely reducing the parallax likelihood.

Further, an ultraviolet rays blocking layer 231' is included in the upper panel 200. Further, quantum dot particles included in a color filter 230' change a wavelength of the ultraviolet rays to be changed into red, green, and blue. Further, in the exemplary embodiment of FIGS. 34 and 35, all layers are laminated on one substrate to be configured as one display panel.

As shown in FIGS. 34 and 35, a liquid crystal display according to another exemplary embodiment of the present invention includes a display panel 100" and a backlight unit 500'.

The backlight unit 500' includes an ultraviolet rays light source 510' and a light guide plate 520. The display panel 100" disposed thereon includes a lower polarizer 11', a lower substrate 110, a liquid crystal layer 3 formed in a microcavity, and an upper insulating layer 310, an upper polarizer 21-1, a color filter 230', an ultraviolet rays blocking layer 231'. In the exemplary embodiment of FIGS. 35 and 36, unlike the exemplary embodiment of FIG. 33, an ultraviolet rays transmitting layer is omitted.

Integrated display panel 100" will now be described in more detail with reference to FIG. 35.

A wiring layer 111 including a thin film transistor (not shown) and the like is formed on a substrate 110 made of transparent glass, plastic, or the like. The wiring layer 111 includes a gate line 121, a storage voltage line 131, a gate insulating layer 140, a data line (not shown), a passivation layer (not shown) and a pixel electrode 190, and the thin film transistor is connected to the gate line 121 and the data line. Structures of the pixel electrode 190, the gate line 121, and the data line formed on the wiring layer 111 may vary according to an exemplary embodiment.

The gate line 121 and the storage voltage line 131 are disposed below the gate insulating layer 140 and electrically separated from each other, and the data line crosses the gate line 121 and the storage voltage line 131 and is insulated therefrom. The gate electrode on the gate line 121 and the source electrode on the data line configure a control terminal and an input terminal of the thin film transistor, respectively. Further, an output terminal (drain electrode) of the thin film transistor is connected with the pixel electrode 190, and the pixel electrode 190 is insulated from the gate line 121, the storage voltage line 131 and the data line.

A support layer 311 is disposed on the pixel electrode 190 and the passivation layer. The support layer 311 serves to support the pixel electrode 190 and the passivation layer so that an inner portion of the support layer 311, that is, an upper space (hereinafter, referred to as a microcavity (see 305 of FIG. 11)) of the pixel electrode 190 and the passivation layer may be formed. A cross section of the support layer 311 according to the exemplary embodiment may have a trapezoid shape, and have a liquid crystal injection hole on one side thereof in order to inject a liquid crystal in the microcavity 305. The support layer 311 may include an inorganic insulating material such as silicon nitride (SiNx) and the like.

Further, in order to arrange liquid crystal molecules injected in the microcavity 305, an alignment layer 12 is formed at the inside of the support layer 311, that is, at the upper portion of the pixel electrode 190 and the passivation layer. The alignment layer 12 made of at least one of generally used materials such as polyamic acid, polysiloxane, or polyimide, or the like as a liquid crystal alignment layer may be formed.

The liquid crystal layer 3 is formed under the alignment layer 12 of the microcavity 305, and the liquid crystal molecules 31 are initially aligned by the alignment layer 12. A thickness of the liquid crystal layer 3 may be about 5 to 6 μm.

A light blocking member 220 is formed between the adjacent support layers 311. The light blocking member 220 includes a material which does not transmit light and has an opening, and the opening may correspond to the microcavity 305.

A common electrode 270 is formed on the support layer 311 and the light blocking member 220. The common electrode 270 and the pixel electrode 190 are made of a transparent conductive material such as ITO or IZO and serve to control an alignment direction of the liquid crystal molecules 31 by generating an electric field.

A flattening layer 312 is formed on the common electrode 270. The flattening layer 312, as a layer for removing a step generated on the common electrode 270 due to the light blocking member 220, may include an organic material.

A patterned insulating layer 313 is formed on the flattening layer 312. The patterned insulating layer 313 may include an inorganic insulating material such as silicon nitride (SiNx). The flattening layer 312 and the patterned insulating layer 313 are patterned together with the support layer 311 to form a liquid crystal injection hole 335. The patterned insulating layer 313 may be omitted according to an exemplary embodiment. In FIG. 34, the support layer 311, the flattening layer 312, and the patterned insulating layer 313 are shown as one upper insulating layer 310.

The upper polarizer 21-1 is disposed on the patterned insulating layer 313. The upper polarizer 21-1 has a characteristic of polarizing light because a metal wirings 21-2 such as aluminum and the like are disposed with an interval of 100 nm or less in order to reduce the thickness. In the exemplary embodiment of FIGS. 34 and 35, since the upper polarizer 21 is not formed, but the polarizer including the metal wirings is used, the thickness of the polarizer may be decreased to about 5 to 10 μm, thereby largely reducing the parallax likelihood.

An upper light blocking member 221 is formed on the upper polarizer 21-1. The upper light blocking member 221 also has an opening, and a color filter 230' corresponding to a color displayed in the corresponding pixel is formed.

First, a red color filter 230R' is formed in a red pixel, a green color filter 230G' is formed in a green pixel, and a blue color filter 230B' is formed in a blue pixel.

The red color filter 230R' may include red quantum dot (QD) particles 230RQD' and converts light having a wavelength supplied by the ultraviolet rays light source 510' into red.

Further, the green color filter 230G' may include green quantum dot (QD) particles 230GQD' and converts light having a wavelength supplied by the ultraviolet rays light source 510' into green.

In addition, the blue color filter 230B' may include blue quantum dot (QD) particles 230BQD' and converts light having a wavelength supplied by the ultraviolet rays light source 510' into blue.

In the exemplary embodiment of the present invention, since the light supplied by the ultraviolet rays light source 510' of the backlight is converted into red, green, and blue light in the red quantum dot (QD) particles 230RQD', the green quantum dot (QD) particles 230GQD', and the blue quantum dot (QD) particles 230BQD', respectively, and then emitted outside to display an image, the direction of the light emitted outside is wide and grays of the light are not changed according to viewing position, such that the light may have a wide viewing angle.

An upper flattening layer 250 is formed on the upper light blocking member 221, the red color filter 230R', the green color filter 230G', and the blue color filter 230B'. The upper flattening layer 250 may be made of an organic material and may also be omitted according to an exemplary embodiment.

An ultraviolet rays blocking layer 231' is formed on the upper flattening layer 250. The ultraviolet rays blocking layer 231' is formed on all pixel areas displaying blue, red, and green. The ultraviolet rays blocking layer 231' may be formed by alternately laminating at least two layers having different refractive indexes, and wavelengths except for an ultraviolet wavelength band are transmitted and the ultraviolet wavelength band is blocked. The blocked ultraviolet rays are reflected and thus a light recycle may also be performed. The ultraviolet rays blocking layer 231' serves to block light emitted from an ultraviolet rays light source 510' from being directly emitted outside.

The lower polarizer 11' is attached to the rear surface of the substrate 110. The lower polarizer 11' transmits only a polarization direction of one direction of the ultraviolet rays. Further, the lower polarizer 11' need not be thinly formed and includes a polarization element generating polarization and a Tri-acetyl-cellulose (TAC) layer for ensuring durability.

Referring back to FIG. 34, the backlight unit 500' is disposed below the lower polarizer 11, and the backlight unit includes the ultraviolet rays light source 510' and the light guide plate 520. A plurality of optical films (not shown) may be formed above the light guide plate 520 and below the lower polarizer 11.

That is, in the exemplary embodiment of FIGS. 34 and 35, the thickness of the entire liquid crystal display is reduced by using only one substrate 110 and the upper polarizer 21-1 disposed between the liquid crystal layer 3 and the color filter 230' is changed into the structure including the metal wirings to largely reduce the thickness, thereby largely reducing the parallax likelihood.

Further, the liquid crystal display according to the exemplary embodiment of the present invention has a wide viewing angle characteristic because the direction of the light is wider by using the quantum dot (QD) color filter 230'.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
  a first substrate;
  a first color conversion layer including red quantum dots and disposed on the first substrate;
  a second color conversion layer including green quantum dots and disposed on the first substrate;
  a light blocking member positioned between the first color conversion layer and the second color conversion layer; and
  a plurality of layers disposed between the first substrate and the first color conversion layer and overlapping the first color conversion layer and the second color conversion layer, wherein a height of the light blocking member is greater than a height of the first color conversion layer, wherein a distance between the light blocking member and the plurality of layers is less than a distance between the first color conversion layer and the plurality of layers, and the plurality of layers comprises at least two layers with different refractive indices and the plurality of layers overlap each other along a thickness direction of the first substrate.

2. The display device of claim 1, further comprising:
a wiring layer disposed on the first substrate,
wherein the wiring layer comprises:
   a gate line and a data line insulated from each other;
   a transistor electrically connected to the gate line and the data line; and
   a pixel electrode electronically connected to the transistor.

3. The display device of claim 2, further comprising:
a common electrode overlapping the pixel electrode.

4. The display device of claim 3, further comprising:
a planarization layer disposed on the common electrode.

5. The display device of claim 4, wherein the planarization layer includes an organic material.

6. The display device of claim 4, further comprising:
an insulating layer positioned on the planarization layer.

7. The display device of claim 6, wherein the insulating layer includes an inorganic material.

8. The display device of claim 1, wherein the light blocking member has an opening, and one of the first color conversion layer and the second color conversion layer is positioned in the opening.

9. The display device of claim 1, wherein blue light is incident on the first color conversion layer and the second color conversion layer.

10. The display device of claim 1, further comprising:
a blue light blocking layer overlapping the first color conversion layer.

11. The display device of claim 10, further comprising:
a transparent layer positioned on the first substrate,
wherein the blue light blocking layer has an opening, and the transparent layer overlaps the opening.

12. The display device of claim 1, further comprising:
a blue light blocking layer overlapping the second color conversion layer.

13. The display device of claim 12, further comprising:
a transparent layer positioned on the first substrate,
wherein the blue light blocking layer has an opening, and the transparent layer overlaps the opening.

14. A display device, comprising:
a transistor and a pixel electrode positioned on a first substrate;
a common electrode overlapping the pixel electrode;
a first color conversion layer including red quantum dots and disposed on the common electrode;
a second color conversion layer including green quantum dots and disposed on the common electrode;
a light blocking member positioned between the first color conversion layer and the second color conversion layer; and
a plurality of layers disposed between the common electrode and the first color conversion layer and overlapping the first color conversion layer and the second color conversion layer,
wherein a height of the light blocking member is greater than a height of the first color conversion layer, and the plurality of layers comprises at least two layers with different refractive indices and the plurality of layers overlap each other along a thickness direction of the first substrate, and a distance between the light blocking member and the plurality of layers is less than a distance between the first color conversion layer and the plurality of layers.

15. The display device of claim 14, further comprising:
a planarization layer disposed on the common electrode,
wherein the planarization layer overlaps the entire surface of the first substrate.

16. The display device of claim 15, wherein the planarization layer includes an organic material.

17. The display device of claim 15, wherein the planarization layer is a first planarization layer, and the display device further comprising a second planarization layer disposed on the first planarization layer.

18. The display device of claim 17, wherein the second planarization layer includes an organic material.

19. The display device of claim 17, further comprising:
an insulating layer positioned between the first planarization layer and the second planarization layer,
wherein the insulating layer includes an inorganic material.

20. The display device of claim 14, further comprising:
a transparent layer positioned on the first substrate; and
a blue light blocking layer overlapping the first color conversion layer,
wherein the blue light blocking layer has an opening, and the opening and the transparent layer overlap each other.

21. A display device, comprising:
a first substrate;
a first color conversion layer including red quantum dots and disposed on the first substrate;
a second color conversion layer including green quantum dots and disposed on the first substrate;
a light blocking member positioned between the first color conversion layer and the second color conversion layer; and
a plurality of layers disposed between the first substrate and the first color conversion layer and overlapping the first color conversion layer and the second color conversion layer,
wherein a first distance is between an upper surface of the first substrate and a lower surface of the first color conversion layer,
a second distance is between the upper surface of the first substrate and a lower surface of the light blocking member,
the first distance is greater than the second distance,
the plurality of layers comprises at least two layers with different refractive indices and the plurality of layers overlap each other along a thickness direction of the first substrate,
a third distance is between the lower surface of the light blocking member and an upper surface of the plurality of layers,
a fourth distance is between the lower surface of the first color conversion layer and the upper surface of the plurality of layers, and
the third distance is less than the fourth distance.

22. The display device of claim 21, wherein the upper surface of the first substrate and the lower surface of the first color conversion layer face each other.

23. The display device of claim 21, wherein the upper surface of the first substrate and the lower surface of the light blocking member face each other.

24. The display device of claim 21, wherein the lower surface of the light blocking member is positioned closer to the upper surface of the first substrate than the lower surface of the first color conversion layer.

* * * * *